(12) United States Patent
Kurabayashi

(10) Patent No.: US 11,541,311 B2
(45) Date of Patent: Jan. 3, 2023

(54) PROGRAM, ELECTRONIC DEVICE, AND METHOD FOR SIMULATING A JOYSTICK IN A VIRTUAL SPACE

(71) Applicant: CYGAMES, INC., Tokyo (JP)

(72) Inventor: Shuichi Kurabayashi, Tokyo (JP)

(73) Assignee: CYGAMES, INC., Tokyo (JP)

(*) Notice: Subject to any disclaimer, the term of this patent is extended or adjusted under 35 U.S.C. 154(b) by 83 days.

(21) Appl. No.: 17/089,816

(22) Filed: Nov. 5, 2020

(65) Prior Publication Data
US 2021/0052984 A1 Feb. 25, 2021

Related U.S. Application Data

(63) Continuation of application No. PCT/JP2019/016971, filed on Apr. 22, 2019.

(30) Foreign Application Priority Data

May 16, 2018 (JP) .............................. JP2018-094656

(51) Int. Cl.
*A63F 13/525* (2014.01)
*A63F 13/2145* (2014.01)
(Continued)

(52) U.S. Cl.
CPC .......... *A63F 13/525* (2014.09); *A63F 13/218* (2014.09); *A63F 13/2145* (2014.09); *G06F 3/0446* (2019.05)

(58) Field of Classification Search
CPC .... A63F 13/2145; A63F 13/92; A63F 13/426; A63F 13/525; A63F 13/218
See application file for complete search history.

(56) References Cited

U.S. PATENT DOCUMENTS 9,652,063 B2 * 5/2017 Murata ................. G06F 3/0488
9,772,743 B1 * 9/2017 Mueller .............. G06F 3/04886
(Continued)

FOREIGN PATENT DOCUMENTS

JP     3734820 B1     1/2006

OTHER PUBLICATIONS

International Search Report issued in Application No. PCT/JP2019/016971, dated Jul. 9, 2019 (4 pages).
(Continued)

*Primary Examiner* — Chase E Leichliter
(74) *Attorney, Agent, or Firm* — Osha Bergman Watanabe & Burton LLP

(57) ABSTRACT

One or more embodiments of the invention is a program that is executed on an electronic device, the program causing the electronic device to execute: holding data points indicated by values on a first axis and values on a second axis, obtained on the basis of touch events; terminating the holding of a data point for which a predefined holding period has expired among the held data points; determining the slope of a regression line on the basis of the held data points; determining an amount of rotation by which the determined slope of the regression line is to be rotated, on the basis of a displacement direction of the set of the held data points; and determining an angle by which the user controls an object being operated in a virtual space, on the basis of the determined slope of the regression line and the determined amount of rotation.

14 Claims, 20 Drawing Sheets

(51) Int. Cl.
*A63F 13/218* (2014.01)
*G06F 3/044* (2006.01)

(56) References Cited

U.S. PATENT DOCUMENTS

| | | | | |
|---|---|---|---|---|
| 2006/0052166 A1* | 3/2006 | Ohta | ............... | A63F 13/02 |
| | | | | 463/36 |
| 2006/0111182 A1* | 5/2006 | Nakanishi | ......... | A63F 13/2145 |
| | | | | 463/36 |
| 2006/0121985 A1* | 6/2006 | Nakanishi | ......... | A63F 13/10 |
| | | | | 463/36 |
| 2008/0039201 A1* | 2/2008 | Asuke | ............. | A63F 13/52 |
| | | | | 463/44 |
| 2011/0172013 A1* | 7/2011 | Shirasaka | ......... | A63F 13/92 |
| | | | | 345/173 |
| 2011/0276879 A1* | 11/2011 | Ando | ............. | A63F 13/2145 |
| | | | | 715/702 |
| 2012/0046106 A1* | 2/2012 | Ito | ............... | A63F 13/428 |
| | | | | 463/37 |
| 2012/0229455 A1* | 9/2012 | Hayashi | ............. | A63F 13/20 |
| | | | | 345/658 |
| 2012/0258796 A1* | 10/2012 | Ohta | ............. | G06T 19/00 |
| | | | | 463/32 |
| 2013/0267316 A1* | 10/2013 | Ohta | ............. | A63F 13/426 |
| | | | | 463/31 |
| 2014/0092048 A1* | 4/2014 | Yamamoto | ......... | A63F 13/2145 |
| | | | | 345/173 |
| 2017/0319960 A1* | 11/2017 | Ohta | ............. | A63F 13/21 |
| 2021/0205698 A1* | 7/2021 | Kurabayashi | ......... | A63F 13/55 |

OTHER PUBLICATIONS

Written Opinion issued in International Application No. PCT/JP2019/016971, dated Jul. 9, 2019 (3 pages).

Baldauf, M. et al.; "Investigating On-Screen Gamepad Designs for Smartphone-Controlled Video Games;" ACM Transactions on Multimedia Computing, Communications, and Applications; vol. 12; No. 1s, Article No. 22; 2015 (19 pages).

* cited by examiner

PROGRAM, ELECTRONIC DEVICE, AND METHOD FOR SIMULATING A JOYSTICK IN A VIRTUAL SPACE

TECHNICAL FIELD

The present invention relates to programs, etc. In particular, the present invention relates to a program that is executed by an electronic device having a touchscreen, etc.

BACKGROUND ART

With recent improvements in touchscreen technology, electronic devices of the type in which user inputs are performed via a user interface on a touchscreen have become widely used. Furthermore, with games that are executed on an electronic device, instead of user inputs via a conventional physical controller, the form in which user inputs are performed via a touchscreen provided on an electronic device becoming widely used.

In particular, compact portable electronic devices, such as smartphones, have rapidly become popular, and a large number of games that are executed on such portable electronic devices have been released. In this situation, various technologies have been proposed concerning methods of operating a virtual object displayed on the touchscreen, such as a player character, including, for example, the technology relating to virtual pads, disclosed in Non-Patent Literature 1.

For example, Patent Literature 1 discloses a game device equipped with a touchscreen, as well as a program, that make it possible to set an origin in accordance with a touch operation by a user and that enables an operation simulating a joystick. The game device sets reference coordinates on the basis of coordinates at the time when detection is started in the case where a touchscreen makes a transition from a state in which a touch has not been detected to a state in which a touch has been detected, and in the case where touch detection is to be continued, sets instruction coordinates on the basis of coordinates detected after the transition. Then, the game device recognizes the direction of a vector from the reference coordinates to the instruction coordinates as the direction in which a joystick is tilted and the magnitude of the vector as the degree by which the joystick is tilted, thereby realizing a virtual joystick, whereby the operation of a virtual object is realized.

CITATION LIST

Patent Literature

{PTL 1}
Publication of Japanese Patent No. 3734820

Non-Patent Literature

{NPL 1}
Matthias Baldauf, Peter Frohlich, Florence Adegeye, and Stefan Suette. 2015. Investigating On-Screen Gamepad Designs for Smartphone-Controlled Video Games. ACM Trans. Multimedia Comput. Commun. Appl. 12, 1s, Article 22 (October 2015), 21 pages. DOI: https://doi.org/10.1145/2808202

SUMMARY OF INVENTION

Technical Problem

In the existing technology disclosed in Patent Literature 1, a user places a finger at one point on the touchscreen to cause the game device to recognize the reference coordinates, slides the finger while maintaining contact, and causes the game device to recognize the instruction coordinates with the contact position of the finger after the slide. With the thus-configured existing technology, when the user inputs a direction, it has been necessary to generate a significant distance from the reference coordinates to the instruction coordinates, which makes it difficult to realize high responsiveness. For example, in the case where the user wishes to perform an operation of considerably tilting the virtual joystick, it has been necessary to generate the magnitude of the vector from the reference coordinates to the instruction coordinates correspondingly to the degree of tilting of the considerably tilted joystick.

Thus, as an operation method for controlling a virtual object displayed on a touchscreen and disposed in a virtual space, for example, there is a demand for realizing a quicker and more intuitive operation method. To put it in a more generalized manner, as an operation method for controlling an object being operated, which is disposed in a virtual space and which may be operated by a user, there is a demand for realizing an operation method with improved operability.

The present invention has been made in order to solve the problem described above, and a main object thereof is to provide a program, etc. that makes it possible to improve operability in controlling an object being operated in a virtual space.

Solution to Problem

In order to achieve the above object, a program according to an aspect of the present invention is a program that is executed on an electronic device equipped with a touchscreen, the program being characterized by causing the electronic device to execute: a step of holding data points indicated by values on a first axis and values on a second axis, obtained on the basis of touch events generated as a result of an operation on the touchscreen by a user; a step of terminating the holding of a data point for which a predefined holding period has expired among the held data points; a step of determining the slope of a regression line on the basis of the held data points; a step of determining an amount of rotation by which the determined slope of the regression line is to be rotated, on the basis of a displacement direction of a set of the held data points; and a step of determining an angle by which the user controls an object being operated in a virtual space, on the basis of the determined slope of the regression line and the determined amount of rotation.

Furthermore, in the present invention, preferably, in the step of determining an amount of rotation, when determining an angle for controlling the object being operated, an amount of rotation indicating whether or not the determined slope is to be rotated by 180 degrees is determined on the basis of a displacement direction of data points temporally succeeding and following each other among the held data points.

Furthermore, in the present invention, preferably, the program causes the electronic device to further execute: a step of determining one of the first axis and the second axis as an axis of an independent variable and determining the other axis as an axis of a dependent variable on the basis of an amount of displacement of the values on the first axis and an amount of displacement of the values on the second axis in the held data points, and in the step of determining the slope of a regression line, the slope of the regression line is determined further on the basis of the determined axis of the independent variable and axis of the dependent variable.

Furthermore, in the present invention, preferably, in the step of determining one of the axes, the one of the axes is determined as the axis of the independent variable on the basis of the difference between a maximum value and a minimum value of the values on the first axis and the difference between a maximum value and a minimum value of the values on the second axis.

Furthermore, in the present invention, preferably, in the step of determining one of the axes, the one of the axes is determined as the axis of the independent variable by comparing the magnitude of the result of applying a weight to the difference between a maximum value and a minimum value of the values on the first axis and the magnitude of the difference between a maximum value and a minimum value of the values on the second axis.

Furthermore, in the present invention, preferably, in the step of determining an amount of rotation, when determining an angle by which the object being controlled is controlled, an amount of rotation indicating whether or not the determined slope of the regression line is to be rotated by 180 degrees is determined by comparing the number of positive values and the number of negative values among the differences between values temporally succeeding and following each other on the axis of the determined independent variable in the held data points.

Furthermore, in the present invention, preferably, the step of determining the slope of a regression line includes: a step of determining the average of the independent variable and the average of the dependent variable in the held data points; a step of determining, by using the determined average, the deviation of the independent variable and the deviation of the dependent variable in the held data points; a step of determining, by using the determined deviation of the independent variable, the variance of the independent variable in the held data points; a step of determining, by using the determined variance of the independent variable and variance of the dependent variable, the covariance in the held data points; and a step of determining the slope of the regression line by dividing the determined covariance by the determined variance of the independent variable.

Furthermore, in the present invention, preferably, the first axis is an X axis indicating the widthwise direction of directions in which sensors of the touchscreen are arrayed, the second axis is a Y axis indicating the lengthwise direction of the directions in which the sensors of the touchscreen are arrayed, which is perpendicular to the first axis, and in the step of determining the slope of a regression line, in the case where the determined axis of the independent variable is the second axis, the slope of the regression line is determined by subtracting, from 90 degrees, an angle corresponding to the determined slope of the regression line, determined by dividing the determined covariance by the determined variance of the independent variable.

Furthermore, in the present invention, preferably, the first axis is an X axis indicating the widthwise direction of directions in which sensors of the touchscreen are arrayed, and the second axis is a Y axis indicating the lengthwise direction of the directions in which the sensors of the touchscreen are arrayed, which is perpendicular to the first axis.

Furthermore, in the present invention, preferably, in the step of determining an angle, an angle is determined per predefined processing period.

Furthermore, in order to achieve the above object, a program according to an aspect of the present invention is a program suite for a game that is executed on the electronic device equipped with the touchscreen, the program suite including the abovementioned program, the program suite being characterized in that the predefined processing period is a period corresponding to a frame rate for executing the game, and in that the program suite causes the execution of: a step of determining an angle and a magnitude per the predefined processing period on the basis of the angle determined per the predefined processing period; and a step of controlling the object being controlled, which is displayed on the touchscreen, on the basis of the angle and magnitude determined per the predefined processing period.

Furthermore, in order to achieve the above object, a program suite according to an aspect of the present invention is a program suite for a game that is executed on the electronic device equipped with the touchscreen, the program suite including the abovementioned program, the program being characterized in that the predefined processing period is a period corresponding to a frame rate for executing the game, and in that the program suite causes the execution of: a step of determining an angle and a magnitude per the predefined processing period on the basis of the angle determined per the predefined processing period; and a step of controlling a virtual camera for photographing a game image, the virtual camera serving as the object being controlled, which is displayed on the touchscreen, on the basis of the angle and magnitude determined per the predefined processing period.

Furthermore, in order to achieve the above object, an electronic device according to an aspect of the present invention is an electronic device equipped with a touchscreen, the electronic device being characterized in that: data points indicated by values on a first axis and values on a second axis, obtained on the basis of touch events generated as a result of an operation on the touchscreen by a user, are held; the holding of a data point for which a predefined holding period has expired among the held data points is terminated; the slope of a regression line is determined on the basis of the held data points; an amount of rotation by which the determined slope of the regression line is to be rotated is determined on the basis of a displacement direction of a set of the held data points; and an angle by which the user controls an object being operated in a virtual space is determined on the basis of the determined slope of the regression line and the determined amount of rotation.

Furthermore, in order to achieve the above object, a method according to an aspect of the present invention is a method that is executed on an electronic device equipped with a touchscreen, the method being characterized by including: a step of holding data points indicated by values on a first axis and values on a second axis, obtained on the basis of touch events generated as a result of an operation on the touchscreen by a user; a step of terminating the holding of a data point for which a predefined holding period has expired among the held data points; a step of determining the slope of a regression line on the basis of the held data points; a step of determining an amount of rotation by which the determined slope of the regression line is to be rotated, on the basis of a displacement direction of a set of the held data points; and a step of determining an angle by which the user controls an object being operated in a virtual space, on the basis of the determined slope of the regression line and the determined amount of rotation.

Advantageous Effects of Invention

The present invention makes it possible to improve operability in controlling an object being operated in a virtual space.

DESCRIPTION OF EMBODIMENTS

An embodiment of the present invention will be described below with reference to the drawings. The same reference signs signify the same or corresponding parts throughout the drawings unless otherwise specifically mentioned, and there are cases where the vertical to horizontal scale is shown to be different from the real scale for convenience of description. Furthermore, there are cases where descriptions that are more detailed than necessary are omitted for convenience of description. For example, there are cases where detailed descriptions of matters that are already well known and repeated descriptions of substantially the same configurations are omitted.

An electronic device 10 according to an embodiment of the present invention has installed therein a game application that presents a user with a virtual object disposed in a virtual space while causing the game to proceed. When the game application is executed, the electronic device 10 according to this embodiment provides a virtual controller (virtual controller) for controlling an object being operated, which is a virtual object being operated by the user in the virtual space, in response to an operation by the user. The virtual space is defined by the game application, and may be either a two-dimensional space or a three-dimensional space. For example, the virtual object is a character or an item disposed in the virtual space. For example, controlling the object being operated means controlling the character or the item disposed in the virtual space.

For convenience of description, in this embodiment it is assumed that the electronic device 10 has the above-described game application installed therein; however, there is no limitation to the above-described game application. It suffices for the electronic device 10 to have installed therein a game application that can control an object being operated in response to an operation by a user. For example, instead of or in addition to the game application, the electronic device 10 may have installed therein an input support application or a simulation application that brings about an action of an object being operated in response to an operation by a user. The virtual controller provided by the electronic device 10 in this embodiment can be used for the type of user input requiring a direction and a magnitude. In the following description, the term "application" refers to application programs in general, and may refer to apps that are installed on a smartphone or a tablet.

Figure 1:
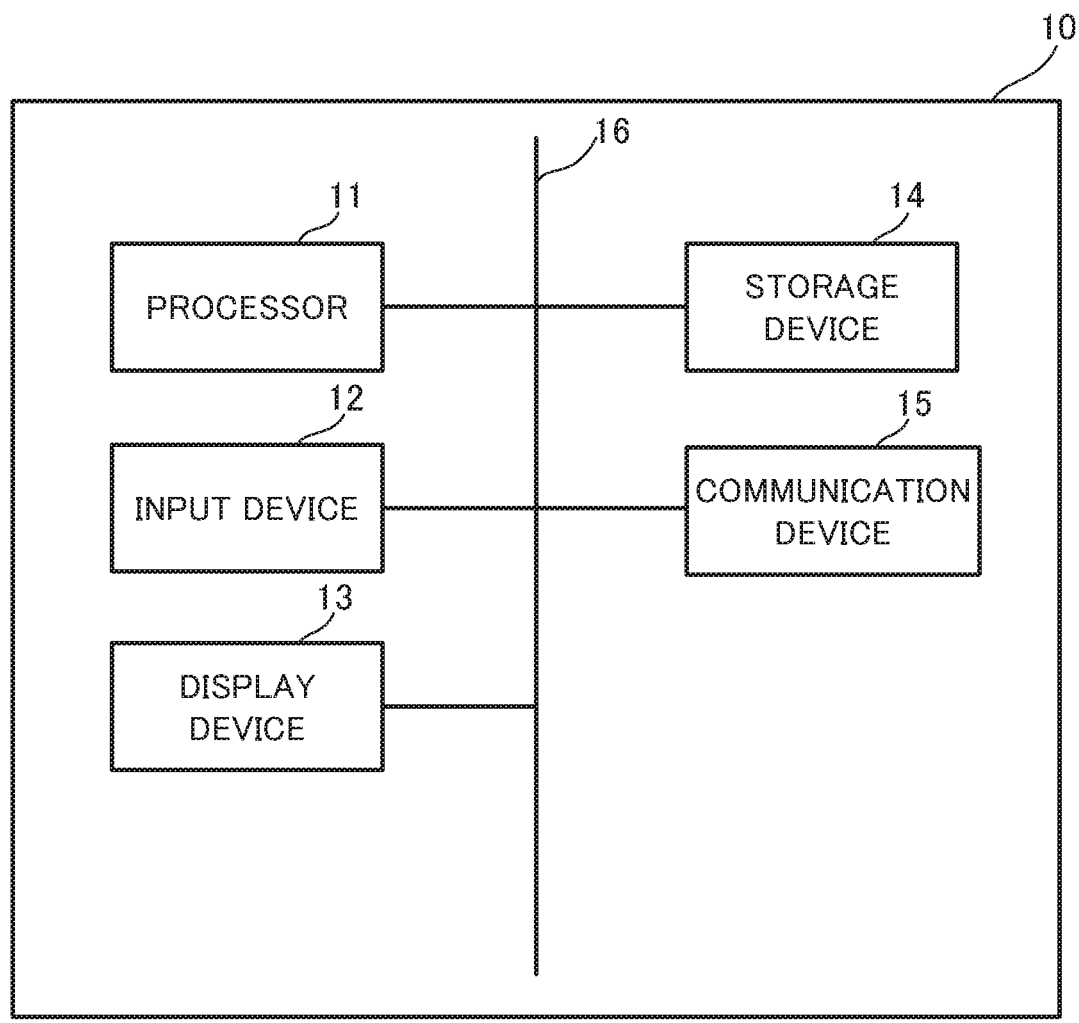
FIG. 1 is a block diagram showing the hardware configuration of an electronic device according to an embodiment of the present invention.

FIG. 1 is a block diagram showing the hardware configuration of the electronic device 10 according to the embodiment of the present invention. The electronic device 10 includes a processor 11, an input device 12, a display device 13, a storage device 14, and a communication device 15. These constituent devices are connected via a bus 16. It is assumed that interfaces are interposed as needed between the bus 16 and the individual constituent devices. In this embodiment, the electronic device 10 is a smartphone. Alternatively, the electronic device 10 may be a terminal such as a computer equipped with a contact-type input device, like a tablet computer or a touchpad, as long as the terminal includes the configuration described above.

The processor 11 controls the overall operation of the electronic device 10. For example, the processor 11 is a CPU. Alternatively, an electronic circuit such as an MPU may be used as the processor 11. The processor 11 executes various kinds of processing by loading programs and data stored in the storage device 14 and executing the programs. In one example, the processor 11 is constituted of a plurality of processors.

The input device 12 is a user interface for accepting inputs to the electronic device 10 from the user; for example, the input device 12 is a touchscreen, a touchpad, a keyboard, or a mouse. The display device (display) 13 displays application screens, etc. to the user of the electronic device 10 under the control of the processor 11. In this embodiment, since the electronic device 10 is a smartphone, the electronic device 10 includes a touchscreen 17 as the input device 12, and the touchscreen 17 also functions as the display device 13; that is, the input device 12 and the display device 13 have an integrated structure. Although the touchscreen 17 in this embodiment is a projection-type capacitive touchscreen, a device having an equivalent function, if any, may be adopted.

The storage device 14 is a storage device included in an ordinary smartphone, including a RAM, which is a volatile memory, and a ROM, which is a non-volatile memory. The storage device 14 may also include an external memory. The storage device 14 stores various kinds of programs, including a game application. For example, the storage unit 14 stores an operating system (OS), middleware, application programs, various kinds of data that may be referred to when these programs are executed, etc.

In one example, the storage device 14 includes a main storage device and an auxiliary storage device. The main storage device is a volatile storage medium that allows high-speed reading and writing of information, and is used as a storage area and a work area when the processor 11 processes information. The auxiliary storage device stores various programs and data that are used by the processor 11 when the individual programs are executed. The auxiliary storage device is, for example, a hard disk device; however, the auxiliary storage device may be any type of non-volatile storage or non-volatile memory, which may be of the removable type, that is capable of storing information.

The communication device 15 sends data to and receives data from other computers, such as a server, via a network. For example, the communication device 15 performs wireless communication, such as mobile communication or wireless LAN communication, to connect to the network 2. In one example, the electronic device 10 downloads a program from a server by means of the communication device 15 and stores the program in the storage device 14. Alternatively, the communication device 15 may perform known wired communication. In the case where data is neither sent to nor received from other computers, the electronic device 10 need not include the communication device 15.

Figure 2:
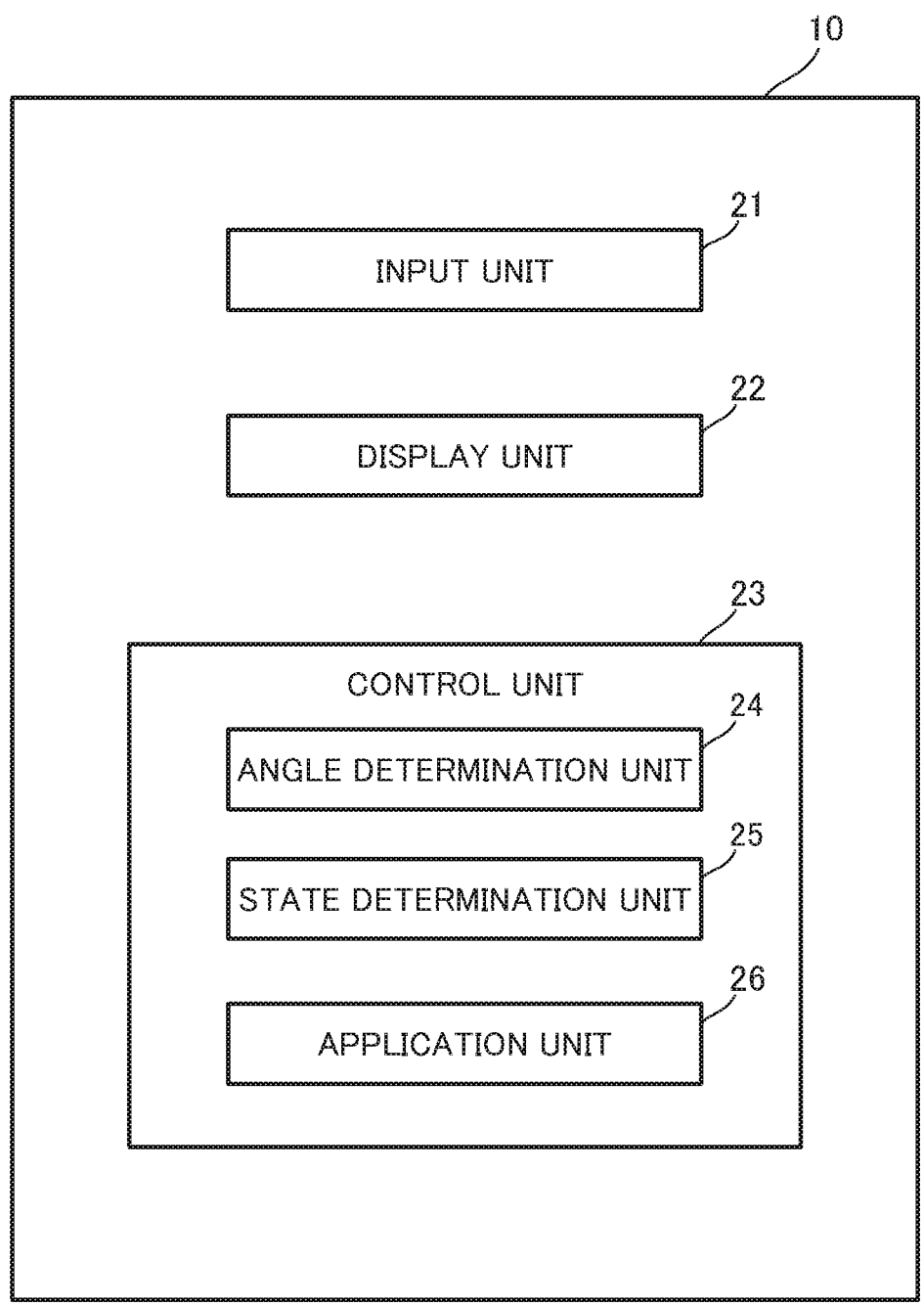
FIG. 2 is a functional block diagram of the electronic device according to the embodiment of the present invention.

FIG. 2 is a functional block diagram of the electronic device 10 according to the embodiment of the present invention. The electronic device 10 includes an input unit 21, a display unit 22, and a control unit 23. The control unit 23 includes an angle determination unit 24, a state determination unit 25, and an application unit 26. In this embodiment, these functions are realized by the processor 11 executing a program. For example, the program that is executed is a program stored in the storage device 14 or received via the communication device 15. Since various kinds of functions are realized by loading a program, as described above, a portion or the entirety of one part (function) may be provided in another part. Alternatively, these functions may be realized by means of hardware by configuring electronic circuits or the like for realizing the individual functions in part or in entirety.

The input unit 21 is configured by using the input device 12, and accepts inputs to the electronic device 10 from the user. In this embodiment, the input unit 21 accepts a touch operation performed on the touchscreen 17 by the user and generates touch events, for which a touch detection function generally provided in a smartphone having the touchscreen 17 can be used.

The display unit 22 displays a game application screen on the display device 13 so as to display a screen in accordance with user operations.

The control unit 23 realizes a virtual controller. In this embodiment, an architecture having a three-layer structure is adopted for the control unit 23, and the angle determination unit 24, the state determination unit 25, and the application unit 26 correspond to the individual layers. For example, the control unit 23 is realized by the processor 11 executing a program suite constituted of programs corresponding to the individual layers.

The role of the angle determination unit 24 in the virtual controller realized by the control unit 23 corresponds to a sensor IC chip inside the controller in the case of a physical controller. The angle determination unit 24 determines an angle for controlling an object being operated by the user in the virtual space by mainly using touch events generated by a touch operation on the touchscreen 17 by the user, and forwards the angle to the state determination unit 25.

The role of the state determination unit 25 corresponds to the entire controller that is operated in the case of a physical controller. The state determination unit 25 determines a vector (angle and magnitude) corresponding to the touch operation performed on the touchscreen 17 by the user by mainly using the angle forwarded from the angle determination unit 24.

The application unit 26 corresponds to a specific game application that implements actions, etc. in a game. In this game application, similarly to game applications in general, a frame rate is defined, and for example, the main loop of a main program is executed per period corresponding to the frame rate. Generally, the frame rate is 30 fps (frames per second) or 60 fps.

The angle determination unit 24 determines an angle that is required when the user controls an object being operated in the virtual space. In one preferred example, the angle determination unit 24 is a mathematical function library for calculating an angle in real time, and is a software module implementing a statistical processing algorithm for calculating an angle from a sequence of touch events during a short period. The sequence of touch events corresponds to finger motion on the touchscreen 17.

The storage device 14 includes a data point buffer. The data point buffer is a buffer that enables the angle determination unit 24 to hold data points obtained on the basis of touch events and indicated by values on a first axis and values on a second axis.

The angle determination unit holds, in the data point buffer, data points obtained on the basis of touch events generated by user operations on the touchscreen 17 and indicated by values on the first axis and values on the second axis. Here, a touch event occurs when the user places a finger in contact with the touchscreen 17 (touchstart), when the user moves the finger while keeping the finger in contact with the touchscreen (touchmove), when the user removes the finger from the touchscreen 17 (touchend), etc. The angle determination unit 24 obtains a touch event when a touch event occurs. When obtaining a touch event, the angle determination unit 24 obtains a set of numerical values (x, y) consisting of two variables and corresponding to a position at which the electrostatic capacitance on the touchscreen 17 has changed, and also obtains time t at which (x, y) was obtained, and stores a set of numerical values (x, y, t) consisting of three variables in the data point buffer. The data of the set of numerical values consisting of two variables is obtained by the angle determination unit 24 in association with a touch event, and corresponds to data points indicated by values on a value on the first axis and a value on the second axis. t is a value representing a data point obtaining time, which is the time at which (x, y) was obtained, and is stored in the data point buffer in association with (x, y), as described above. In one example, t is an integer value called the UNIX (registered trademark) time or a character sequence such as "2017/07/14 15:48:43.444". Hereinafter, unless otherwise specifically mentioned, the holding (or termination of holding) of a data point by the angle determination unit 24 includes the holding (or termination of holding) of a data point obtaining time t associated with the data point.

Figure 3:
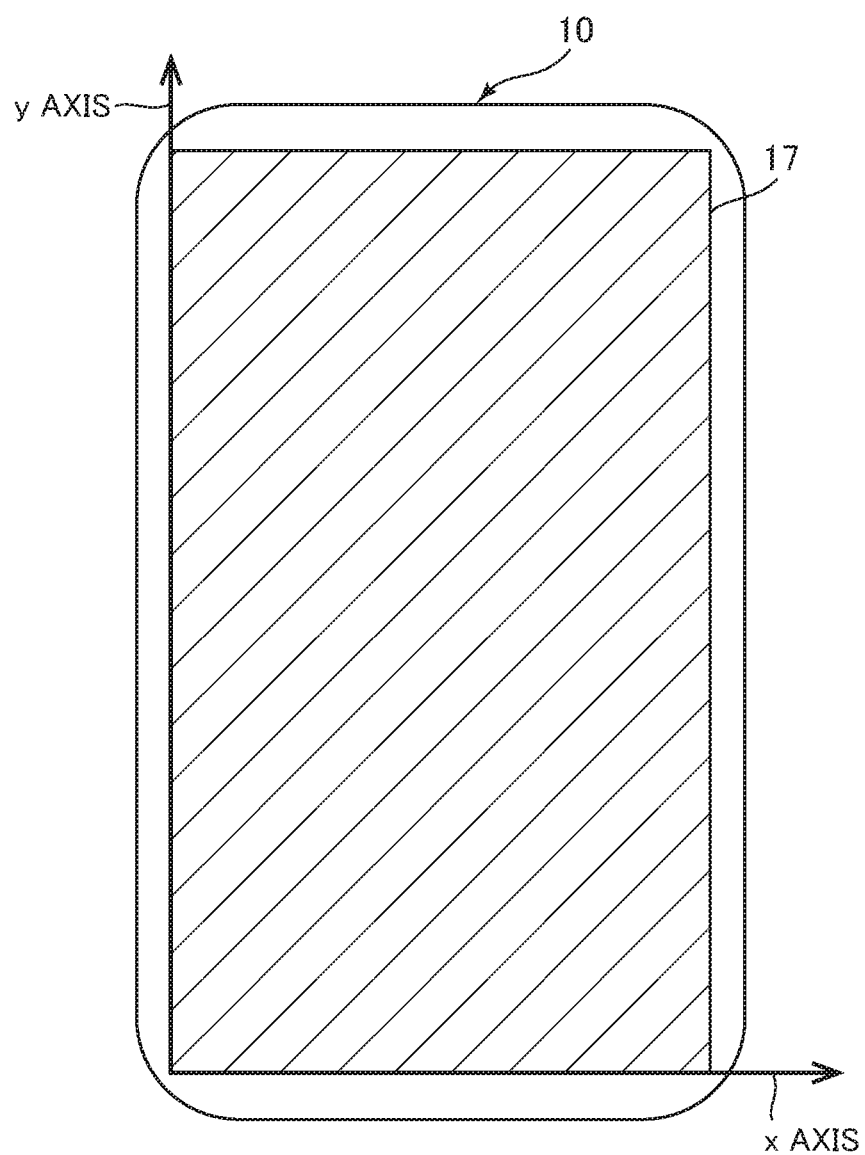
FIG. 3 is an illustration showing coordinate axes consisting of a first axis and a second axis in the embodiment.

In this embodiment, for convenience of description, the first axis and the second axis are defined as follows. FIG. 3 is an illustration showing coordinate axes consisting of the first axis and the second axis in this embodiment. The first axis is an axis indicating the widthwise direction of the directions substantially parallel to the directions in which the sensors of the touchscreen 17 are arrayed; i.e., the first axis is a horizontal axis (x axis) substantially parallel to the shorter sides of the touchscreen 17. The second axis is an axis perpendicular to the first axis and indicating the lengthwise direction of the directions substantially parallel to the directions in which the sensors of the touchscreen 17 are arrayed; i.e., the second axis is a vertical axis (y axis) substantially parallel to the longer sides of the touchscreen 17. As described above, the first axis and the second axis are substantially parallel to the directions in which the sensors of the touchscreen 17 are arrayed, and a position on the touchscreen 17 is expressed in the form of coordinates (x, y) along the two axes. Thus, in this embodiment, the coordinates (x, y) of a data point correspond to a position on the touchscreen 17. In this embodiment, the angle determination unit 24 holds the coordinates (x, y) as a data point in the data point buffer. The coordinate setting shown in FIG. 3 is just an example, and coordinates may be set differently from the above example depending on the sensor array of the touchscreen 17 or the program implemented by the electronic device 10. The sensors are, for example, electrodes.

Figure 4:
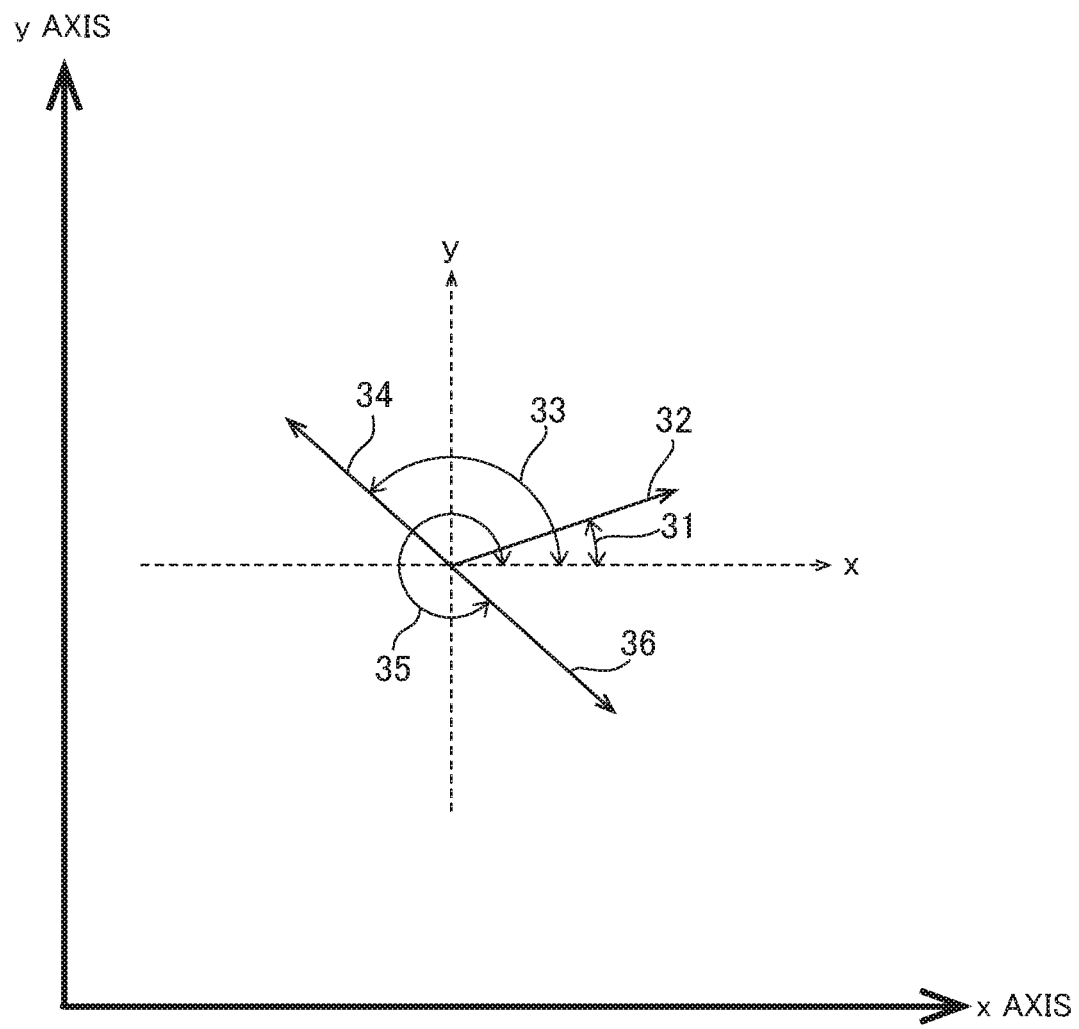
FIG. 4 is an illustration for explaining an example of an angle determined by an angle determination unit and a direction corresponding to that angle.

FIG. 4 is an illustration for explaining an example of an angle determined by the angle determination unit 24 and a direction corresponding to the angle in the case where coordinate axes are defined as shown in FIG. 3. An angle 31 in the first quadrant corresponds to a direction 32, an angle 33 in the second quadrant corresponds to a direction 34, and an angle 35 in the fourth quadrant corresponds to a direction 36. Here, although the direction 34 and the direction 36 have the same slope, since the direction 34 and the direction 36 are opposite to each other, it is possible to confirm that the angle 33 and the angle 35 differ by 180 degrees.

The angle determination unit 24 terminates the holding of a data point for which a predefined holding period has expired among the data points held in the data point buffer. For example, when terminating the holding of a data point, the angle determination unit 24 may delete the data, invalidate the data, or delete the data, as appropriate, by associating a flag indicating that the holding has been terminated with the data. The angle determination unit 24, defines a variable D specifying, in milliseconds, the life of the data points stored in the data point buffer. The period specified by the variable D corresponds to the predefined holding period. However, the value of the variable D is not limited to milliseconds.

For example, after storing one data point in the data point buffer, the angle determination unit 24 monitors the time elapsed since the storage of the data point and continuously compares the time elapsed with the variable D. When the monitored time elapsed for the data point exceeds the variable D, the angle determination unit 24 terminates the holding of the data point in the data point buffer. In this manner, the angle determination unit 24 manages the life of every data point held in the data point buffer. At this time, the angle determination unit 24 can calculate the elapsed time by using the data point obtaining time t. It is assumed that the case where it is determined that the time elapsed exceeds the variable D may mean the case where it is determined that the time elapsed is greater than or equal to the variable D. Furthermore, the unit of the time elapsed for a data point, managed by the angle determination unit 24, should preferably be the same as that of the variable D.

For example, when 165 is set in the variable D, the angle determination unit 24 holds a data point stored in the data point buffer for 165 milliseconds, and after 165 milliseconds has elapsed, terminates the holding of the data point in the data point buffer.

The angle determination unit 24 periodically determines whether or not it is possible to calculate an angle. In the case where it is possible to calculate an angle, the angle determination unit 24 calculates an angle indicated by the set of data points held in the data point buffer by using the data points, and determines the angle as an angle by which the user controls the object being operated in the virtual space. By obtaining the angle indicated by the set of data points, as described above, the angle determination unit 24 can obtain an angle of the direction intended by the user who has performed a touch operation on the touchscreen 17.

The angle determination unit 24 outputs the determined angle to the state determination unit 25. When outputting the determined angle to the state determination unit 25, for example, the angle determination unit 24 outputs the determined angle together with information indicating an angle event. Instead of direct output to the state determination unit 25, the angle determination unit 24 may store the determined angle and the information indicating an angle event in a memory area in the storage unit 14 referred to by the state determination unit 25.

When the obtained touch event is touchstart, the angle determination unit 24 outputs a start event to the state determination unit 25, and does not calculate an angle. When the obtained touch event is touchend, the angle determination unit 24 outputs a stop event to the state determination unit 25, and does not calculate an angle.

The angle determination unit 24 defines a variable B, and calculates and determines an angle by using the data points held in the data point buffer in the case where the number of the data points is greater than or equal to the value of the variable B. In the case where the number of the data points held in the data point buffer is less than the value of the variable B, in which case it is not possible to calculate an angle indicated by the set of data points with at least a certain level of accuracy, the angle determination unit 24 outputs a keep event to the state determination unit 25, and does not calculate an angle. Since it is generally preferable that three or more data points are available when obtaining the slope of a regression line, the variable B should preferably be set to be 3 or greater. In this embodiment, the variable B is set to be 3.

The angle determination unit 24 defines a variable I specifying, in milliseconds, the time interval for determining whether or not the angle determination unit 24 can calculate an angle. In the case where the situation where the angle determination unit 24 cannot calculate an angle continues, like a situation where touch events continuously occur, the interval serves as a time interval for the angle determination unit 24 to calculate an angle. However, the value of the variable I is not limited to milliseconds.

The angle determination unit 24 determines an angle per predefined processing period by determining whether or not it is possible to calculate an angle per predefined processing period, as described above. In one preferred example, the predefined processing period is a period corresponding to the frame rate for executing the game. In the case where the frame rate is 30 fps (30 Hz), the variable I is set to be 33. When 33 is set in the variable 1, the angle determination unit 24 determines whether or not it is possible to calculate an angle every 33 milliseconds. In the case where it is possible to calculate an angle, the angle determination unit 24 determines a calculated angle and outputs the determined angle together with an angle event to the state determination unit 25. In the case where it is not possible to calculate an angle, the angle determination unit 24 outputs one of a start event, a stop event, and a keep event to the state determination unit 25. The angle event may include information indicating an angle, and in this case, the angle determination unit 24 outputs an angle event to the state determination unit 25 in the case where it is possible to calculate an angle.

In calculating an angle indicated by the set of data points held in the data point buffer, the angle determination unit 24 determines the slope of a regression line on the basis of the data points held in the data point buffer. Here, the number of data points referred to by the angle determination unit 24 is greater than or equal to 3. In determining the slope of a regression line, the angle determination unit 24 determines one of the x axis and the y axis as the axis of an independent variable on the basis of the amount of displacement in the values on the x axis and the amount of displacement in the values on the y axis in the data points held in the data point buffer. At the same time, the angle determination unit 24 determines the other axis as the axis of a dependent variable.

In this embodiment, the angle determination unit 24 calculates the slope of a regression line by using the method of least squares. The method of obtaining the slope of a regression line by using the method of least squares is known; in this method, the degree of correlation between an independent variable and a dependent variable is obtained in the form of the slope. The method of least squares is generally applied by considering the x axis as the axis of an independent variable and the y axis as the axis of a dependent variable. However, in the case where the value on the x axis is fixed and only the value on the y axis changes, the dependent variable has no dependency on the independent variable. Furthermore, in the case where a slope along the y axis is determined, the determined slope sometimes changes from a large negative value to a large positive value across the y axis, which makes it difficult to stably find the slope. Thus, the angle determination unit 24 determines which of the value on the x axis and the value on the y axis is suitable as an independent variable, and determines the slope of a regression line by using the method of least squares on the basis of the axis of the independent variable and the axis of the dependent variable thus determined.

The angle determination unit 24 determines the slope a of a regression line $y=ax+b$ when the axis of the independent variable is the x axis, and determines the slope c of a regression line $x=cy+d$ when the axis of the independent variable is the y axis. Specifically, the angle determination unit 24 obtains the slope of a regression line through (a) to (e) below.

(a) The angle determination unit 24 calculates (determines) the average of the independent variable and the average of the dependent variable in the data points held in the data point buffer.

(b) By using the averages calculated in (a), the angle determination unit 24 calculates (determines) the deviation of the independent variable and the deviation of the dependent variable in the data points held in the data point buffer.

(c) By using the deviation of the independent variable, determined in (b), the angle determination unit 24, calculates (determines) the variance of the independent variable in the data points held in the data point buffer.

(d) The angle determination unit 24, by using the deviation of the independent variable and the deviation of the independent variable, determined in (b), calculates (determines) the covariance in the data points held in the data point buffer.

(e) The angle determination unit 24 calculates (determines) the slope of the regression line by dividing the covariance, determined in (d), by the variance of the independent variable, determined in (c).

In one example, the angle determination unit 24 determines one of the x axis and the y axis as the axis of the independent variable and determines the other axis as the axis of the dependent variable on the basis of the difference between the maximum value and the minimum value of the values on the x axis and the difference between the maximum value and the minimum value of the values on the y axis in the data points held in the data point buffer. Preferably, the angle determination unit 24 determines one of the x axis and the y axis as the axis of the independent variable and determines the other axis as the axis of the dependent variable on the basis of the difference between the maximum value and the minimum value of the values on the x axis, the difference being weighted by using a weight coefficient, and the difference between the maximum value and the minimum value of the values on the y axis in the data points held in the data point buffer.

The angle determination unit 24 calculates (determines) the slope of a regression line by using the method of least squares, as described above. Preferably, the calculation of the slope of a regression line by the angle determination unit 24 means the calculation of the angle of the slope of a regression line by the angle determination unit 24. Here, since the calculated slope of a regression line does not have a positive or negative direction, when calculating the slope of a regression line by using the method of least squares, the angle determination unit 24 calculates the slope, for example, within the range of 0 to 90 degrees and 270 to 360 degrees. Thus, for example, the slope of a regression line is calculated to be 45 degrees, whether the angle indicated by the set of data points is 45 degrees or 225 degrees. Thus, after determining the slope of a regression line, on the basis of the displacement direction of the set of data points held in the data point buffer, the angle determination unit 24 determines the amount of rotation by which the determined slope of the regression line is to be rotated. Specifically, after determining the slope of a regression line, when determining an angle by which the user controls the object being controlled, the angle determination unit 24 determines an amount of rotation indicating whether or not (the angle of) the determined slope of the regression line is to be rotated by 180 degrees. Here, the displacement direction of the set of data points indicates a direction in which the data points become displaced with time, and corresponds, for example, to a rough direction in which the user moves a finger on the touchscreen 17.

In one example, the angle determination unit 24 determines the amount of rotation on the basis of the displacement direction of data points temporally succeeding and following each other among the data points held in the data point buffer. Preferably, the angle determination unit 24 determines the amount of rotation by comparing the number of positive differences and the number of negative differences between the values temporally succeeding and following each other on the axis of the determined independent variable in the data points held in the data point buffer. The amount of rotation that is determined is an amount of rotation indicating whether or not the determined slope of the regression line is to be rotated by 180 degrees.

The angle determination unit 24 stores data points so as to sequentially hold the data points in order from data points stored earlier in the data point buffer. Alternatively, when storing data points in the data point buffer, the angle determination unit 24 stores identification information that enables identification of the order of storage in association with the data points. As described above, the angle determination unit 24 holds data points in the data point buffer in such a manner that the order of storage can be identified, i.e., in such a manner that the temporal order of the stored data points can be identified. At this time, the angle determination unit 24 can use the values of data point obtaining times t.

The angle determination unit 24 calculates an angle indicated by the set of data points on the basis of the determined slope of the regression line and the determined amount of rotation, and determines the angle as an angle by which the user controls the object being operated in the virtual space.

In this embodiment, the determination of the slope of a regression line, the determination of an amount of rotation, and the determination of an angle, performed by the angle determination unit 24 described above, are realized by using an aop(x, y) function expressed in Eq. (1). The function aop(x, y) calculates an angle in the form of a real value in the range of 0 to 360 degrees. It is assumed that the data point buffer holds n data points P(x, y) when the function aop(x, y) calculates an angle. Furthermore, the value on the x axis and the value on the y axis of each of the n data points $P_k$ (k=1 to n) are expressed by $P_k(x_k, y_k)$, and it is assumed that the order of storage, in order from earlier storage, is $P_1(x_1, y_1), P_2(x_2, y_2), \ldots, P_n(x_n, y_n)$.

$$aop(x, y) = \quad (1)$$

$$\begin{cases} 180\dfrac{\operatorname{atan}\left(\dfrac{\sum_{i=1}^{n}(x_i-\overline{x})(y_i-\overline{y})}{\sum_{i=1}^{n}(x_i-\overline{x})^2}\right)}{\pi}, & \neg\operatorname{rotate}(x,y) \land \neg\operatorname{left}(x) \\[2ex] -180\dfrac{\operatorname{atan}\left(\dfrac{\sum_{i=1}^{n}(x_i-\overline{x})(y_i-\overline{y})}{\sum_{i=1}^{n}(y_i-\overline{y})^2}\right)}{\pi}+90, & \operatorname{rotate}(x,y) \land \neg\operatorname{down}(y) \\[2ex] -180\dfrac{\operatorname{atan}\left(\dfrac{\sum_{i=1}^{n}(x_i-\overline{x})(y_i-\overline{y})}{\sum_{i=1}^{n}(y_i-\overline{y})^2}\right)}{\pi}+270, & \operatorname{rotate}(x,y) \land \operatorname{down}(y) \\[2ex] 180\dfrac{\operatorname{atan}\left(\dfrac{\sum_{i=1}^{n}(x_i-\overline{x})(y_i-\overline{y})}{\sum_{i=1}^{n}(x_i-\overline{x})^2}\right)}{\pi}+180, & \neg\operatorname{rotate}(x,y) \land \operatorname{left}(x) \end{cases}$$

For the purpose of case classification, the function aop(x, y) uses a function rotate(x, y), a function left(x), and a function down(y). First, the function aop(x, y) determines either one of e and y as an independent variable by using the function rotate(x, y).

The function rotate(x, y) is defined by Eq. (2).

$$\operatorname{rotate}(x,y) = w \cdot (\max(x) - \min(x)) < (\max(y) - \min(y)) \quad (2)$$

The function rotate(x, y) determines whether or not the n data points P(x, y) are displaced mainly in the y axis direction, and returns, for example, a true or false value. The case where the n data points P(x, y) are displaced mainly in the y axis direction refers to, for example, the case where a finger of the user has been moved on the touchscreen 17 mainly in the vertical direction. In this manner, the function rotate(x, y) determines whether the n data points P(x, y) are displaced mainly in the x axis (horizontal) direction or mainly in the y axis (vertical) direction, thereby determining which of the value on the x axis and the value on the y axis is suitable as an independent variable.

In Eq. (2), (max(x)−min(x)) signifies the absolute value of the difference between the maximum value and the minimum value among the x values $(x_1, x_2, \ldots x^n)$ of the n data points P, which indicates the amount of displacement of the n data points P in the x axis direction. Similarly, (max(y)−min(y)) signifies the absolute value of the difference between the maximum value and the minimum value among the y values $(y_1, y_2, \ldots y_n)$ of the n data points P, which indicates the amount of displacement of the n data points P in the y axis direction. A variable w is a weight coefficient for applying a weight to (max (x)−min(x)).

The function rotate(x, y) satisfies the inequality when (max(y)−min(y)) is greater than the product of (max(x)−min(x)) and the variable w, in which case the function aop(x, y) performs coordinate transformation. In this case, the function aop(x, y) determines an amount of rotation by considering the y axis as the axis of the independent variable, considering the x axis as the axis of the dependent variable, and further using the function down(y). Meanwhile, the function rotate(x, y) does not satisfy the inequality when (max(y)−min(y)) is less than or equal to the product of (max(x)−min(x)) and the variable w, in which case the function aop(x, y) does not perform coordinate transformation. In this case, the function aop(x, y) determines an amount of rotation by considering the x axis as the axis of the independent variable, considering the y axis as the axis of the dependent variable, and further using the function left(x).

In the case where the function rotate(x, y) is not weighted with the variable w, the function aop(x, y) results in performing coordinate transformation if the amount of displacement in the y axis direction is slightly greater than the amount of displacement in the x axis direction. By applying a weight with the variable w, it becomes possible with the function aop(x, y) to perform coordinate transformation in the case where the n data points P(x, y) have a slope more approximate to the y axis.

Figure 17:
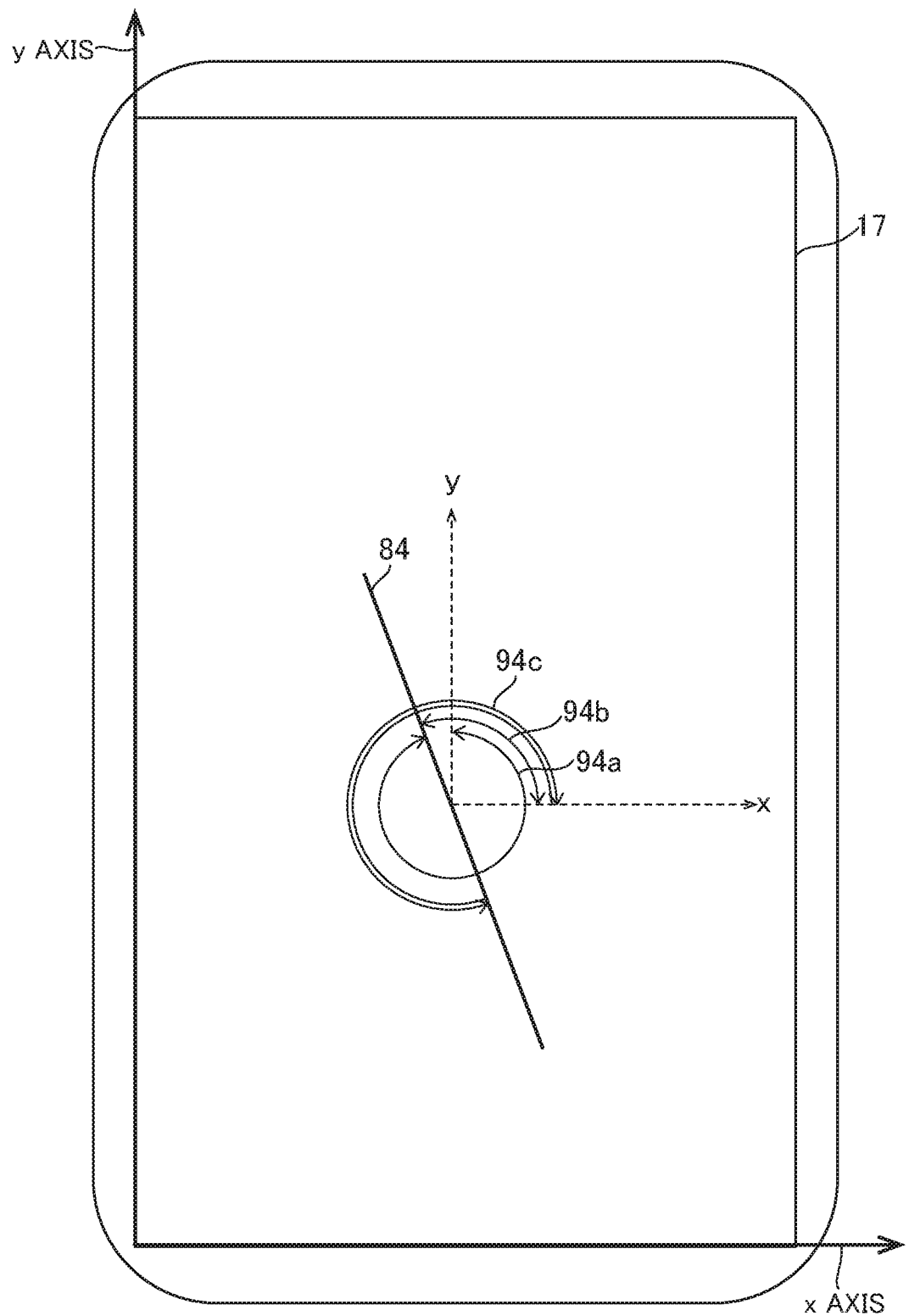
FIG. 17 is an illustration showing an angle calculated by the function aop(x, y) by using the slope of the regression line shown in FIG. 16.

For example, since a smartphone is usually used in portrait orientation, the y axis of the touchscreen 17 shown in FIG. 17 usually becomes substantially parallel to the gravitational direction. Considering that the dimension of the touchscreen 17 in the y axis direction is greater than that in the x axis direction, the variable w should preferably be set to be a value greater than 1. As an example, the variable w should preferably be set to be 2. In another example, in the case where the smartphone is held in landscape orientation and a game engine provided in the game app does not perform transformation between vertical and horizontal coordinates, the angle determination unit 24 sets w to be a value less than 1, such as 0.5.

The function left(x) is expressed by Eq. (3)

$$\text{left}(x) = |\{x' | x'_i > 0\}| > |\{x' | x'_i < 0\}|, x' \leftarrow [x_1 - x_0, x_2 - x_1, \ldots, x_n - x_{n-1}] \quad (3)$$

In the case where the function rotate(x, y) does not satisfy the inequality, the function left(x) determines whether or not the displacement direction of the n data points P(x, y) is the −x axis direction (leftward direction), and returns, for example, a true or false value. Specifically, the function left(x) calculates the differences $(x_2-x_1, x_3-x_2, \ldots x_n-x_{n-1})$ of values temporally succeeding and following each other in the x values $(x_1, x_2, \ldots x_n)$ of the n data points P. The function left(x) determines whether or not the displacement direction of the n data points P(x, y) is the −x axis direction (leftward direction) by determining whether or not the number of negative differences is greater than the number of positive differences. In this manner, the function left(x) determines whether the displacement direction of the n data points P(x, y) is the −x axis direction (leftward direction) or the +x axis direction (rightward direction), thereby determining an amount of rotation indicating whether or not the determined slope of the regression line is to be rotated by 180 degrees. For example, the function aop(x, y) determines the amount of rotation to be 180 degrees in the case where the function left(x) is true, and the function aop(x, y) determines the amount of rotation to be 0 degrees in the case where the function left(x) is false.

The function down(y) is expressed by Eq. (4).

$$\text{down}(y) = |\{y' | y'_i > 0\}| < |\{y' | y'_i < 0\}|, y' \leftarrow [y-y_0, y_2-y_1, \ldots, y_n-y_{n-1}] \quad (4)$$

In the case where the function rotate(x, y) satisfies the inequality, the function down(y) determines whether or not the displacement direction of the n data points P(x, y) is the −y axis direction (downward direction), and returns, for example, a true or false value. Specifically, the function down(y) calculates the differences $(y_2-y_1, y_3-y_2, \ldots y_n-y_{n-1})$ of values temporally succeeding and following each other in the y values $(y_1, y_2, \ldots y_n)$ of the n data points P. The function down(y) determines whether or not the displacement direction of the n data points P(x, y) is the −y axis direction (downward direction) by determining whether or not the number of negative differences is greater than the number of positive differences. In this manner, the function down(y) determines whether the displacement direction of the n data points P(x, y) is the −y axis direction (downward direction) or the +y axis direction (upward direction), thereby determining an amount of rotation indicating whether or not the determined slope of the regression line is to be rotated by 180 degrees. For example, the function aop(x, y) determines the amount of rotation to be 180 degrees in the case where the function down(y) is true, and the function aop(x, y) determines the amount of rotation to be 0 degrees in the case where the function down(y) is false.

After determining the independent variable (the axis of the independent variable) and the amount of rotation in the manner described above, the function aop(x, y) calculates the slope by using the method of least squares. In the case where x is considered as the independent variable and y is considered as the dependent variable, the function aop(x, y) calculates the slope a of the regression line y=ax+b according to Eq. (5).

$$a = \frac{\sum_{i=1}^{n}(x_i - \bar{x})(y_i - \bar{y})}{\sum_{i=1}^{n}(x_i - \bar{x})^2} \quad (5)$$

Here, $$\bar{x}$$

signifies the average of x (independent variable), $$\bar{y}$$

signifies the average of y (dependent variable), $$n\sum_{i=1}^{n}(x_i - \bar{x})(y_i - \bar{y})$$

signifies the covariance of x (independent variable) and y (dependent variable), and $$\sum_{i=1}^{n}(x_i - \bar{x})^2$$

signifies the variance of x (independent variable).

In the case where y is considered as the independent variable and x is considered as the dependent variable, the function aop(x, y) calculates the slope c of the regression line x=cy+d according to Eq. (6).

$$c = \frac{\sum_{i=1}^{n}(x_i - \bar{x})(y_i - \bar{y})}{\sum_{i=1}^{n}(y_i - \bar{y})^2} \quad (6)$$

Here, $$\bar{x}$$

signifies the average of x (dependent variable), $$\bar{y}$$

signifies the average of y (independent variable), $$n\sum_{i=1}^{n}(x_i-\bar{x})(y_i-\bar{y})$$

signifies the covariance of x (dependent variable) and y (independent variable), and $$\sum_{i=1}^{n}(y_i-\bar{y})^2$$

signifies the variance of y (independent variable).

The angle determination unit 24 defines a variable V, and in the case where the variance of the independent variable is greater than or equal to V, calculates and determines an angle by using the function aop(x, y). In the case where the variance of the independent variable is less than V, the angle determination unit 24 outputs a keep event to the state determination unit 25, and does not calculate an angle. The case where the variance of the independent variable is less than V indicates that the n data points P(x, y) are locally concentrated. Thus, by defining the variable V, it becomes possible for the angle determination unit 24 to calculate an angle stably while disregarding finger motion that is too small. The variable V is preferably set to be 0.7

In the case where the function rotate(x, y) is false and the function left(x) is false, the function aop(x, y) directly calculates an angle obtained from the slope of the regression line. In the case where the function rotate(x, y) is false and the function left(x) is true, the function aop(x, y) calculates an angle obtained by adding 180 degrees to an angle obtained from the slope of the regression line. In the case where the function rotate(x, y) is true and the function down(y) is false, the function aop(x, y) calculates an angle by subtracting an angle obtained from the slope of the regression line from 90 degrees. In the case where the function rotate(x, y) is true and the function down(y) is true, the function aop(x, y) calculates an angle by adding 180 degrees to an angle obtained by subtracting an angle obtained from the slope of the regression line from 90 degrees.

The state determination unit 25 determines an angle and a magnitude per predefined processing period on the basis of the angle defined by the angle determination unit 24 per predefined processing period. The state determination unit 25 outputs the determined angle and magnitude to the application unit 26. Instead of direct output to the application unit 26, the state determination unit 25 may store information indicating the determined angle and magnitude in a memory area referred to by the application unit 26. In one preferred example, the state determination unit 25 is a software module that converts a sequence of successively calculated angles into a function of a controller. This module is implemented as a state management model (state machine) using the angle and the time, without using touched coordinates at all.

Upon receiving the information output from the angle determination unit 24 per predefined processing period, the state determination unit 25 outputs the state of the slope of the virtual controller per predefined processing period in accordance with the received event. The virtual controller realizes a physical analog controller by means of software, and the slope of the virtual controller corresponds to the slope of a joystick or level of a physical controller. The state determination unit 25 outputs the state of the slope of the virtual controller in the form of a vector, i.e., as a direction (angle) and a magnitude. The magnitude may be acceleration information or speed information. The state of the slope of the virtual controller corresponds to a quantity input to a physical analog controller.

As described above, the state determination unit 25 can be considered as providing a state transition model for interpreting the meaning of a generated touch event. The state determination unit 25 manages the slope of the virtual controller as a state, and upon receiving the information output from the angle determination unit 24 per predefined processing period, causes a state transition to occur per predefined processing period.

In one example, the state determination unit 25 accumulates the information about the angle output from the angle determination unit 24, and calculates an output to the application unit 26 in accordance with time. For example, in the case where the angle determination unit 24 outputs 45 degrees per 33 ms continuously over 165 ms, the state determination unit 25 determines acceleration information in the direction of 45 degrees for 165 ms. For example, in the case where the same angle is continuously output from the angle determination unit 24, the state determination unit 25 outputs information indicating acceleration in the direction of that angle, and in the case where an angle opposite to the abovementioned angle by 180 degrees is subsequently input from the angle determination unit 24, the state determination unit 25 outputs information indicating deceleration. With this configuration, it becomes possible to obtain a quantity input to the controller in the form of a period corresponding to the number of state transitions, without having to directly use actual touched coordinates.

In one example, upon receiving the information output from the angle determination unit 24, the state determination unit 25 sets the state of the slope of the virtual controller in accordance with the received event, and outputs a movement event or an acceleration event to the game application together with the information indicating the angle and the magnitude. Specifically, the state determination unit 25 can implement acceleration processing simulating a physical analog controller by using a predetermined programming language.

In one preferred example, the state determination unit 25 holds the state of the slope of the virtual controller in the form of a vector, and outputs the held vector per predefined processing period. When a start event is received from the angle determination unit 24, the state determination unit 25 starts state management. When an angle event is initially received from the angle determination unit 24, the state determination unit 25 starts holding a vector consisting of the received angle and the magnitude of a single state transition, and outputs the vector. When another angle event is further received from the angle determination unit 24, the state determination unit 25 adds a vector consisting of the received angle and the magnitude of a single state transition to the internally held vector, and holds and outputs the resulting vector. The state determination unit 25 normalizes the length of the output vector to 1.0 in the case where the length exceeds 1.0.

For example, when angle information indicating 45 degrees is received once from the angle determination unit 24, the state determination unit 25 outputs and holds a vector consisting of an angle of 45 degrees and a magnitude of 0.2. When angle information indicating 45 degrees is received four further times from the angle determination unit 24, the state determination unit 25 holds and outputs a vector consisting of an angle of 45 degrees and a magnitude of 1.0. Also, when angle information indicating 45 degrees is received another time from the angle determination unit 24, the state determination unit 25 holds and outputs a vector consisting of an angle of 45 degrees and a magnitude of 1.0. When angle information indicating 30 degrees is received, the state determination unit 25 adds together a vector consisting of an angle of 30 degrees and a magnitude of 0.2 and the vector consisting of the angle of 45 degrees and the magnitude of 1.0, and holds and outputs a vector consisting of the resulting angle and the magnitude of 1.0. Also in this case, since the magnitude of the vector exceeds 1.0, the state determination unit 25 normalizes the magnitude to 1.0 when outputting the vector.

When a keep event is received from the angle determination unit 24, the state determination unit 25 continues holding the internally held vector and outputs the vector. When a stop event is received from the angle determination unit 24, the state determination unit 25 quits holding the internally held vector, and either outputs a zero vector or outputs the stop event.

With this configuration, it becomes possible to realize operations similar to those via a physical analog controller on a smartphone.

The application unit 26 has the function of an app activated on the electronic device 10, and provides a service by the app. In one preferred example, the application unit 26 converts the vector output from the state determination unit 25 into motion of a specific virtual character or the like, which is a function implemented in ordinary game apps. In the case where the app is a Web app, a server that communicates with the electronic device 10 has the application unit 26 in part or in entirety, and the app sends data to and receives data from the server.

An example of the angle calculation by the angle determination unit 24 using the function aop(x, y) expressed in Eq. 1 will be described below. In the following example, it is assumed that the variable w is 2 and that the variance of the independent variable is greater than or equal to V, and it is assumed that t1 to t4 each signify an arbitrary time at which the angle determination unit 24 calculates an angle.

Figure 5:
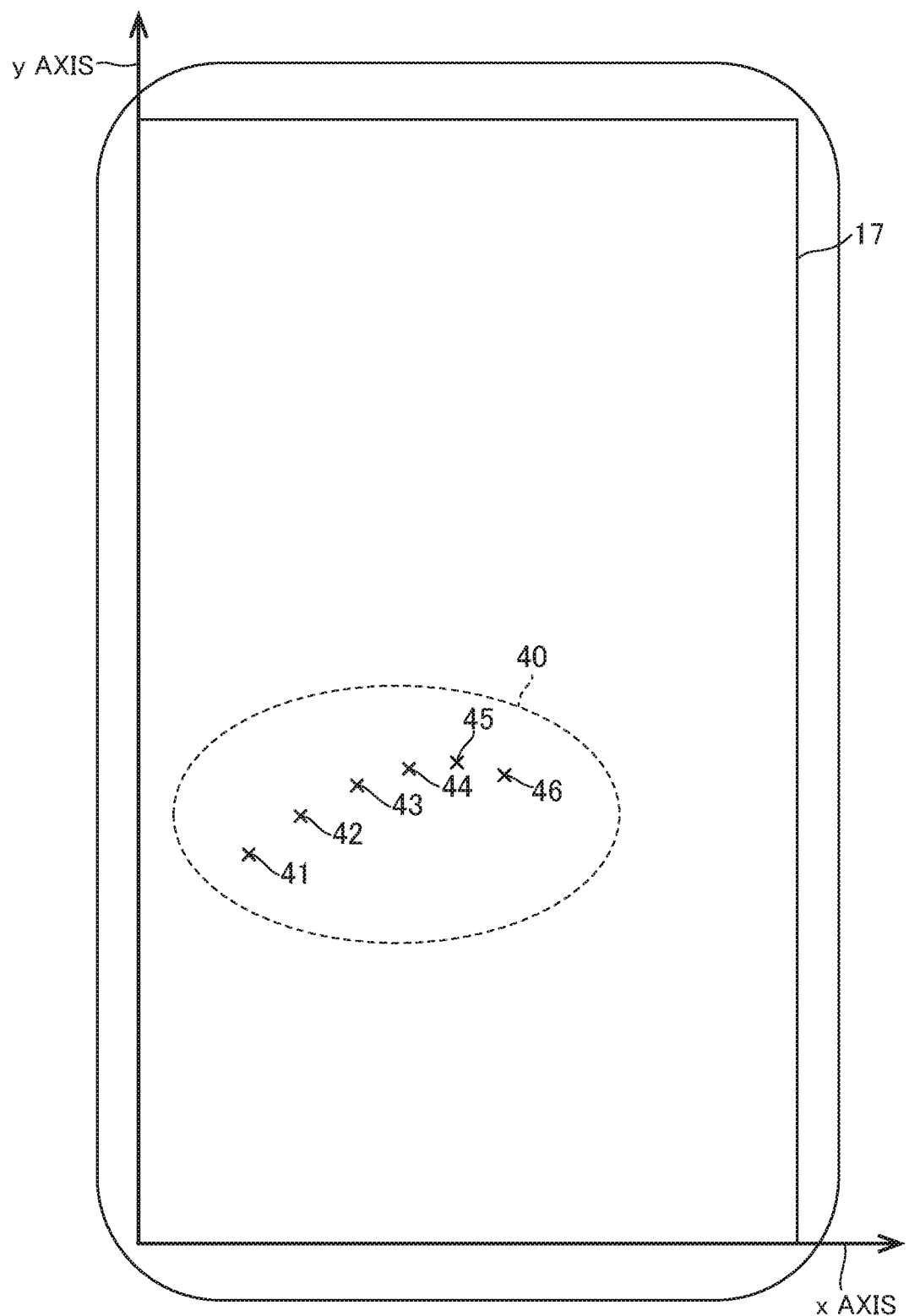
FIG. 5 is an illustration showing an example of data points held in a data point buffer at time t1.

FIG. 5 is an illustration showing an example of the data points held in the data point buffer at time t1. A set 40 of the data points held in the data point buffer consists of six data points P41 to P46. Furthermore, the coordinates (x, y) of the x coordinate values and the y coordinate values of P41 to P46 are individually P41($x_{41}$, $y_{41}$), P42($x_{42}$, $y_{42}$), . . . P46($x_{46}$, $y_{46}$), and it is assumed that the data points were stored in the data point buffer in the order P41, P42, . . . , P46.

Figure 6:
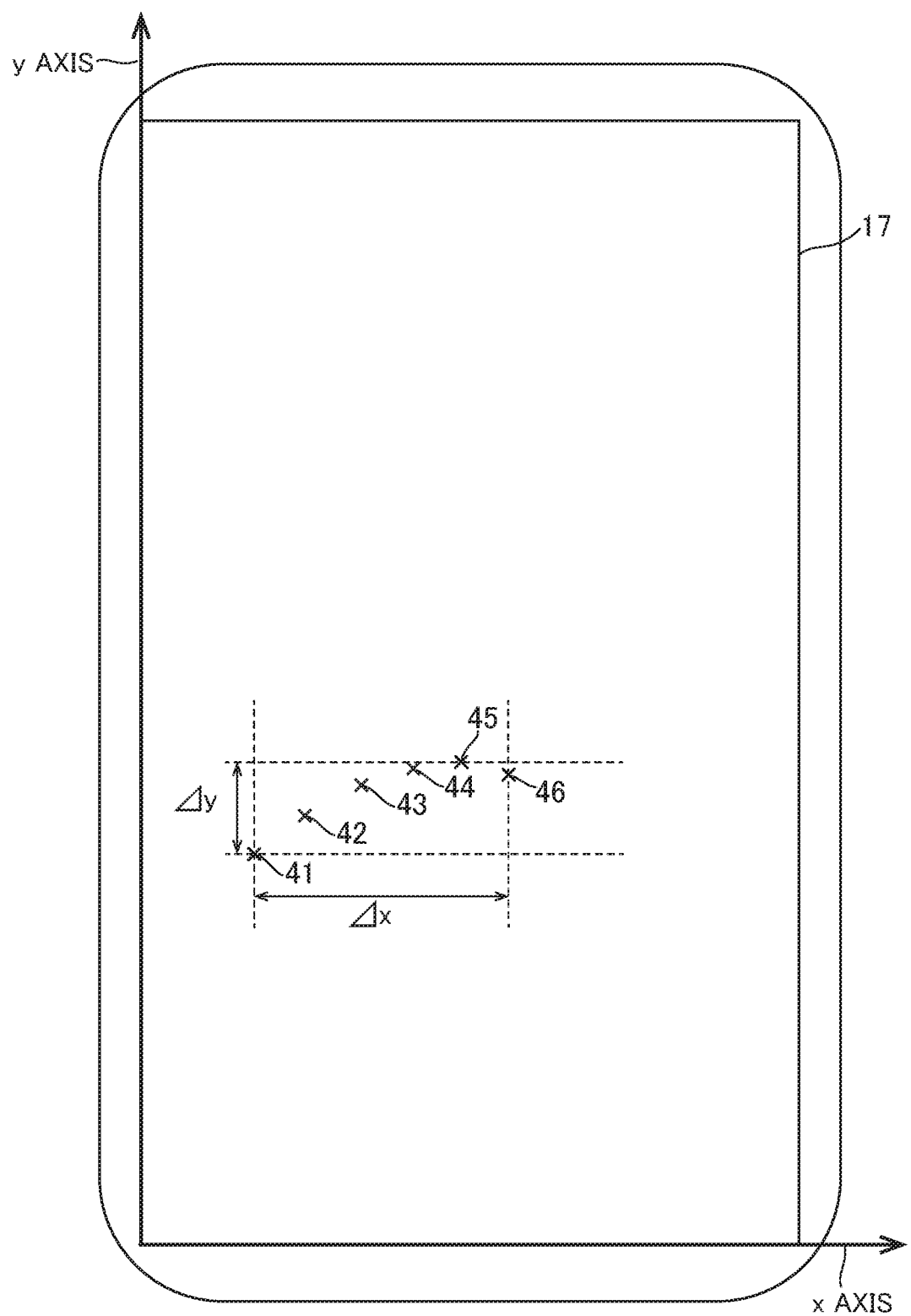
FIG. 6 is an illustration showing an example of data points held in the data point buffer at time t1.

Initially, the function aop(x, y) compares abs(max(x)−min(x)) and abs(max(y)−min(y)) with each other by using the function rotate(x, y). It is understood from FIG. 6 that the difference $x_{46}-x_{41}$ (=Δx) between the x coordinate values of P46 and P41 corresponds to abs(max(x)−min(x)) and that the difference $y_{45}-y_{41}$ (=Δy) between the y coordinate values of P45 and P41 corresponds to abs(max(y)−min(y)).

According to FIG. 5, Δx>Δy. Thus, the function rotate(x, y) does not satisfy the inequality and thus returns a false value.

Then, the function aop(x, y) calculates the differences ($x_{42}-x_{41}$, $x_{43}-x_{42}$, . . . $x_{46}-x_{45}$) between values temporally succeeding and following each other by using the function left(x). According to FIG. 5, all the differences are positive. Thus, the function left(x) does not satisfy the inequality and thus returns a false value.

Figure 7:
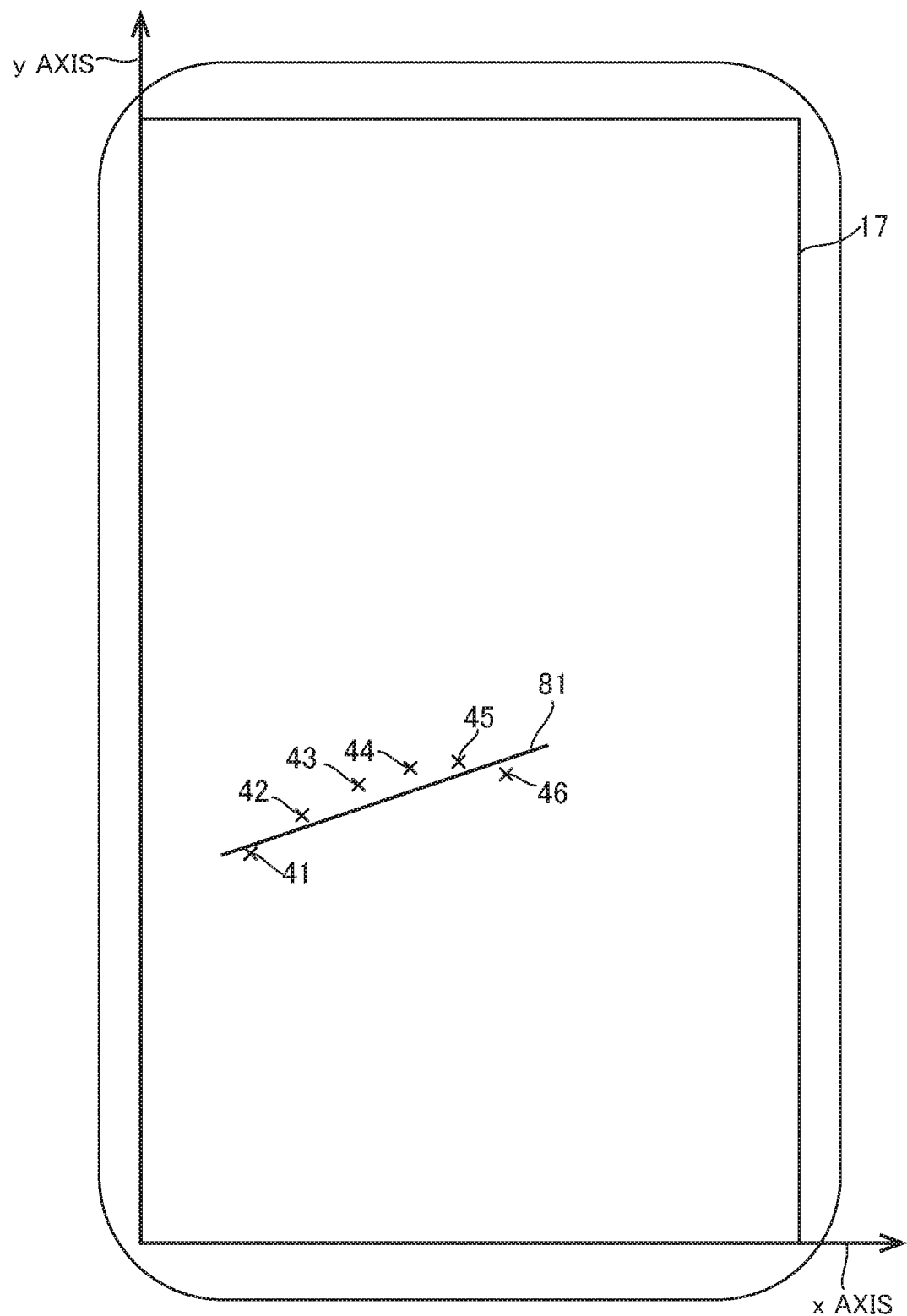
FIG. 7 is an illustration showing a regression line obtained from the set of data points shown in FIG. 5.
Figure 8:
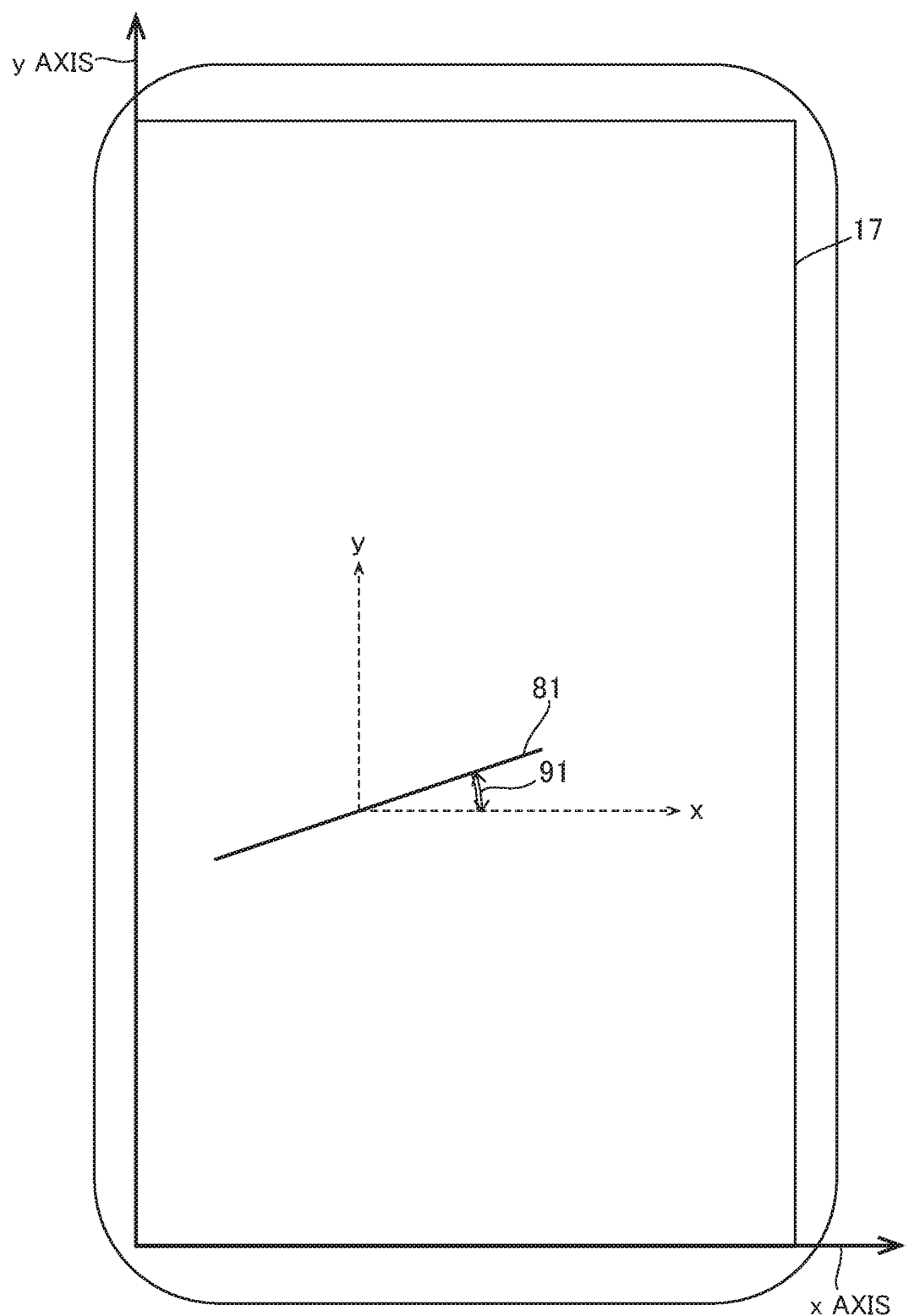
FIG. 8 is an illustration showing an angle calculated by a function aop(x, y) by using the slope of the regression line shown in FIG. 7.

In the above example, the function rotate(x, y) is false, and the function left(x) is false. Thus, the function aop(x, y) obtains a regression line 81, shown in FIG. 7, from the set 40 of data points, and calculates an angle 91 from the slope of the regression line 81, as shown in FIG. 8.

Figure 9:
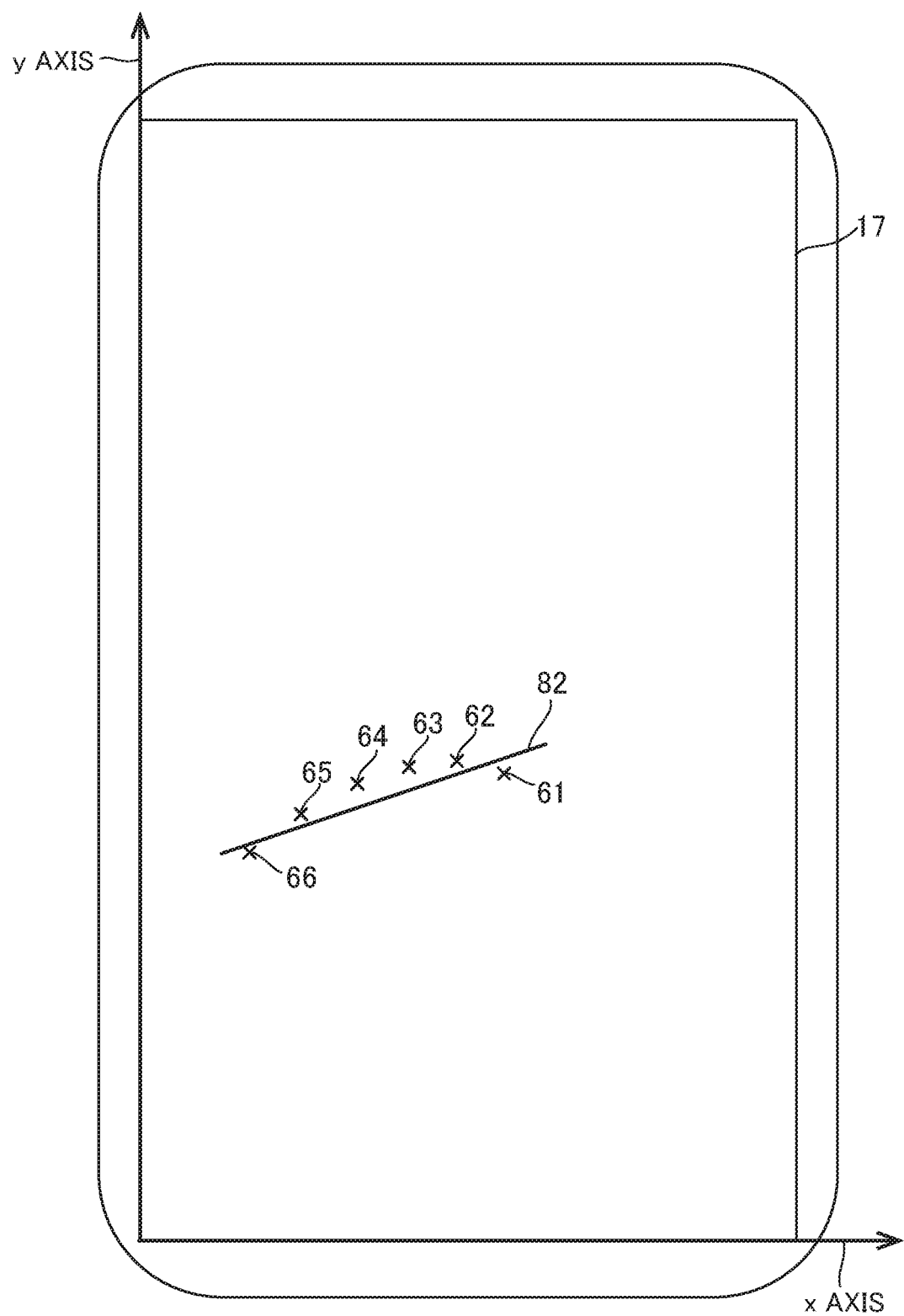
FIG. 9 is an illustration showing an example of data points held in the data point buffer at time t2.

FIG. 9 is an illustration showing an example of the data points held in the data point buffer at time t2. A set 60 of the data points held in the data point buffer consists of six data points P61 to P66. The x coordinate values and the y coordinate values of P61, P62, . . . P66 are respectively the same as the x coordinate values and the y coordinate values of P46, P45, . . . , P41, and it is assumed that the data points were stored in the order P61, P62, . . . , P66.

Similarly to the case of the example in FIG. 5, the function rotate(x, y) does not satisfy the inequality and thus returns a false value. Then, the function aop(x, y) calculates the differences between values temporally succeeding and following each other by using the function left(x). According to FIG. 9, all the differences are negative. Thus, the function left(x) satisfies the inequality and returns a true value.

Figure 10:
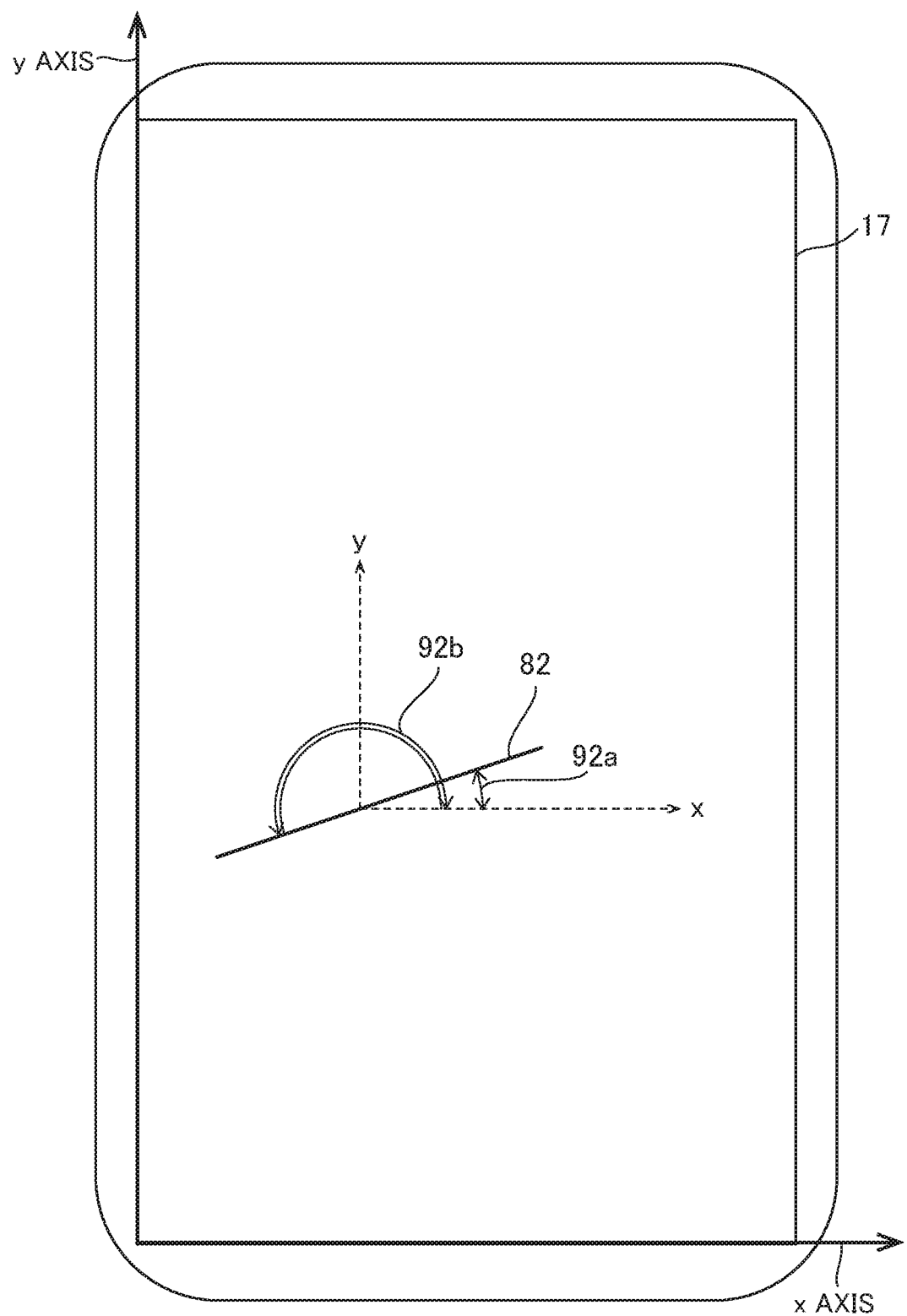
FIG. 10 is an illustration showing an angle calculated by the function aop(x, y) by using the slope of the regression line shown in FIG. 9.

In the above example, the function rotate(x, y) is false, and the function left(x) is true. Thus, the function aop(x, y) obtains a regression line 82, shown in FIG. 9, from the set 60 of data points, and calculates an angle 92*b* obtained by adding 180 degrees to an angle 92*a* calculated from the slope of the regression line 82, as shown in FIG. 10.

Figure 11:
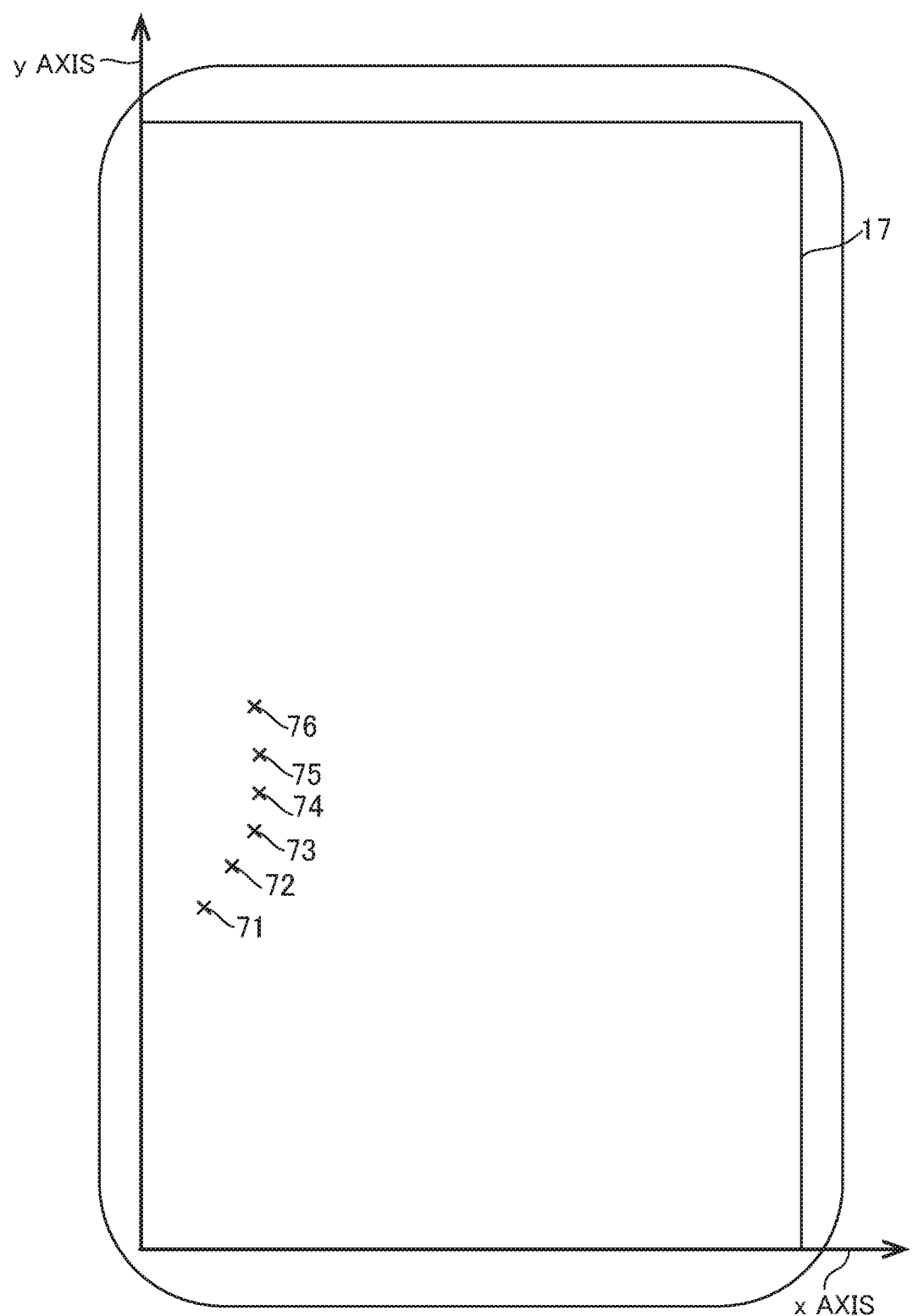
FIG. 11 is an illustration showing an example of data points held in the data point buffer at time t3.

FIG. 11 is an illustration showing an example of the data points held in the data point buffer at time t3. A set 70 of the data points held in the data point buffer consists of six data points P71 to P76. Furthermore, the x coordinate values and the y coordinate values of P71 to P76 are individually P71($x_{71}$, $y_{71}$), P72($x_{72}$, $y_{72}$), . . . P76($x_{76}$, $y_{76}$), and it is assumed that the data points were stored in the data point buffer in the order P71, P72, . . . , P76.

Figure 12:
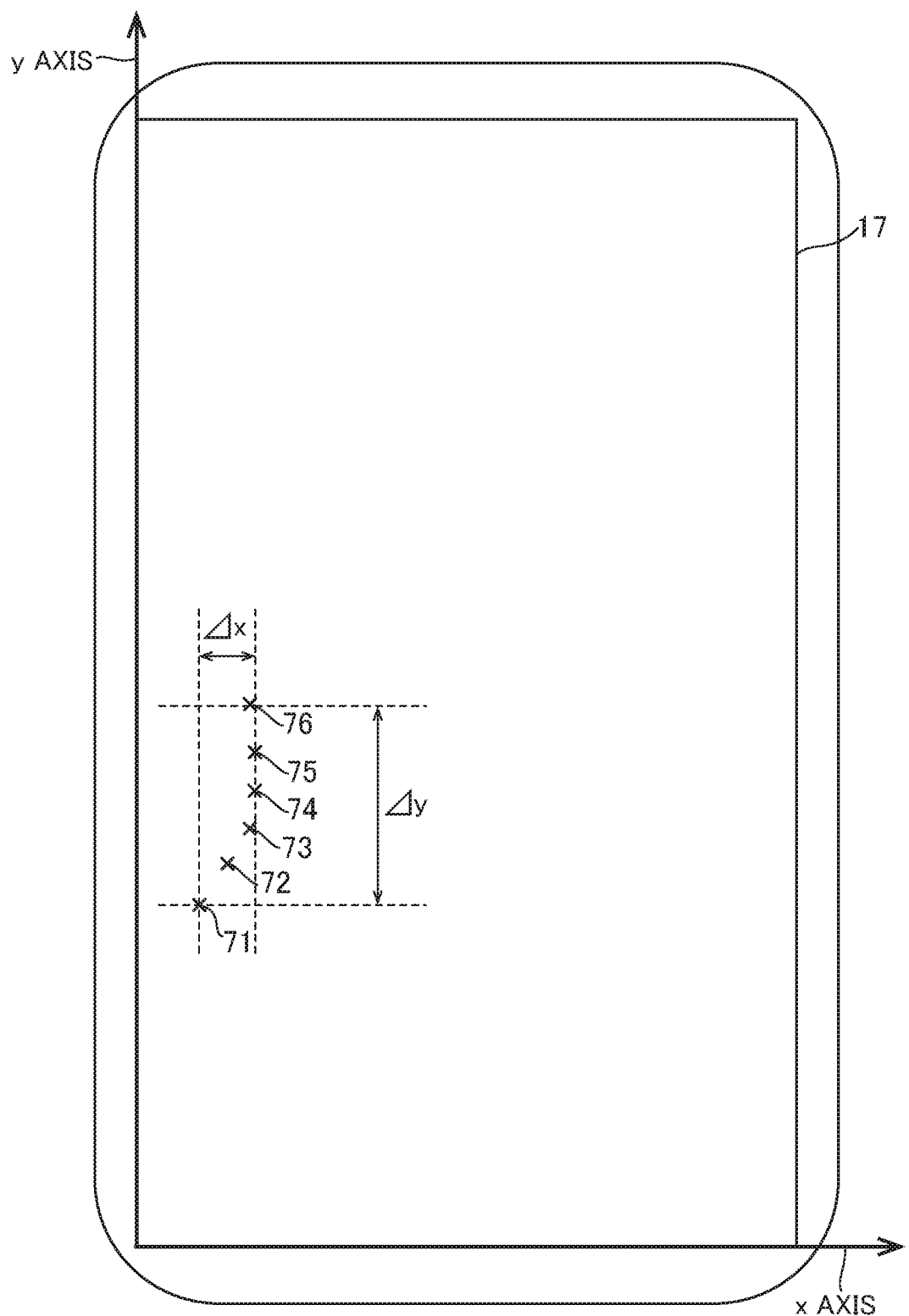
FIG. 12 is an illustration showing an example of data points held in the data point buffer at time t3.

It is understood from FIG. 12 that the difference $x_{75}-x_{71}$ (=Δx) between the x coordinate values of P75 and P71 corresponds to abs(max(x)−min(x)) and that the difference $y_{76}-y_{71}$ (=Δy) between the y coordinate values of P76 and P71 corresponds to abs(max(y)−min(y)). According to FIG. 11, 2×Δx<Δy. Thus, the function rotate(x, y) satisfies the inequality and thus returns a true value.

Then, the function aop(x, y) calculates the differences ($y_{72}-y_{71}$, $y_{73}-y_{72}$, . . . $y_{76}-y_{75}$) between values temporally succeeding and following each other by using the function down(y). According to FIG. 11, all the differences are positive. Thus, the function down(y) does not satisfy the inequality and thus returns a false value.

Figure 13:
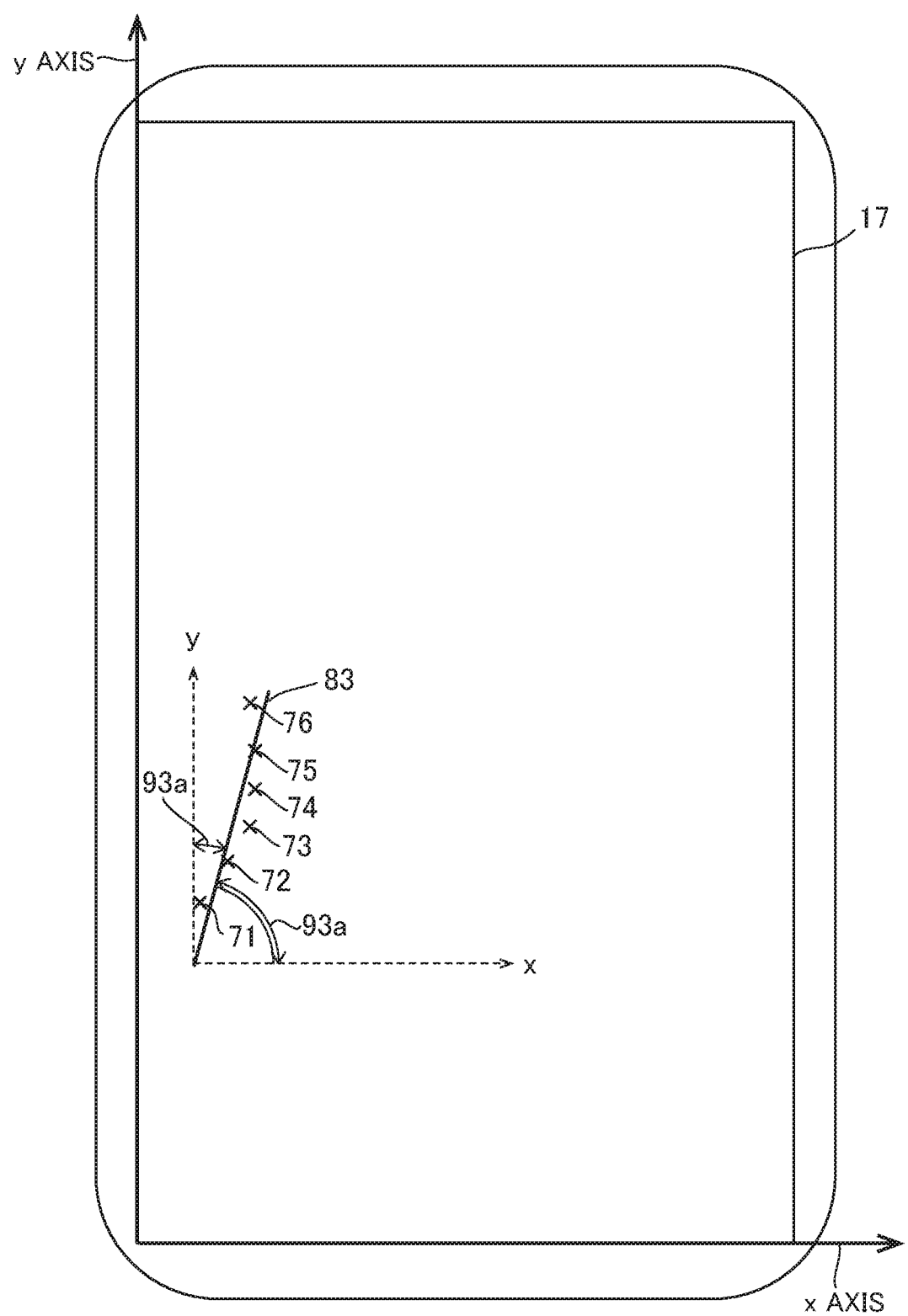
FIG. 13 is an illustration showing an angle calculated by the function aop(x, y) by using a regression line obtained from the set of data points shown in FIG. 11 and the slope of the regression line.

In the above example, the function rotate(x, y) is true, and the function down(y) is false. Thus, the function aop(x, y) obtains a regression line 83, shown in FIG. 13, from the set 70 of data points, and calculates an angle 93*b* obtained by subtracting an angle 93*a* calculated from the slope of the regression line 83 from 90 degrees, as shown in FIG. 13. Here, the angle 93*a* shown in FIG. 13 is shown so as to correspond to the position in the case where the angle calculated from the slope of the regression line 83 in the case where y is considered as the independent variable and x is considered as the dependent variable is transformed back to the coordinates in which x is considered as the independent variable and y is considered as the dependent variable.

Figure 14:
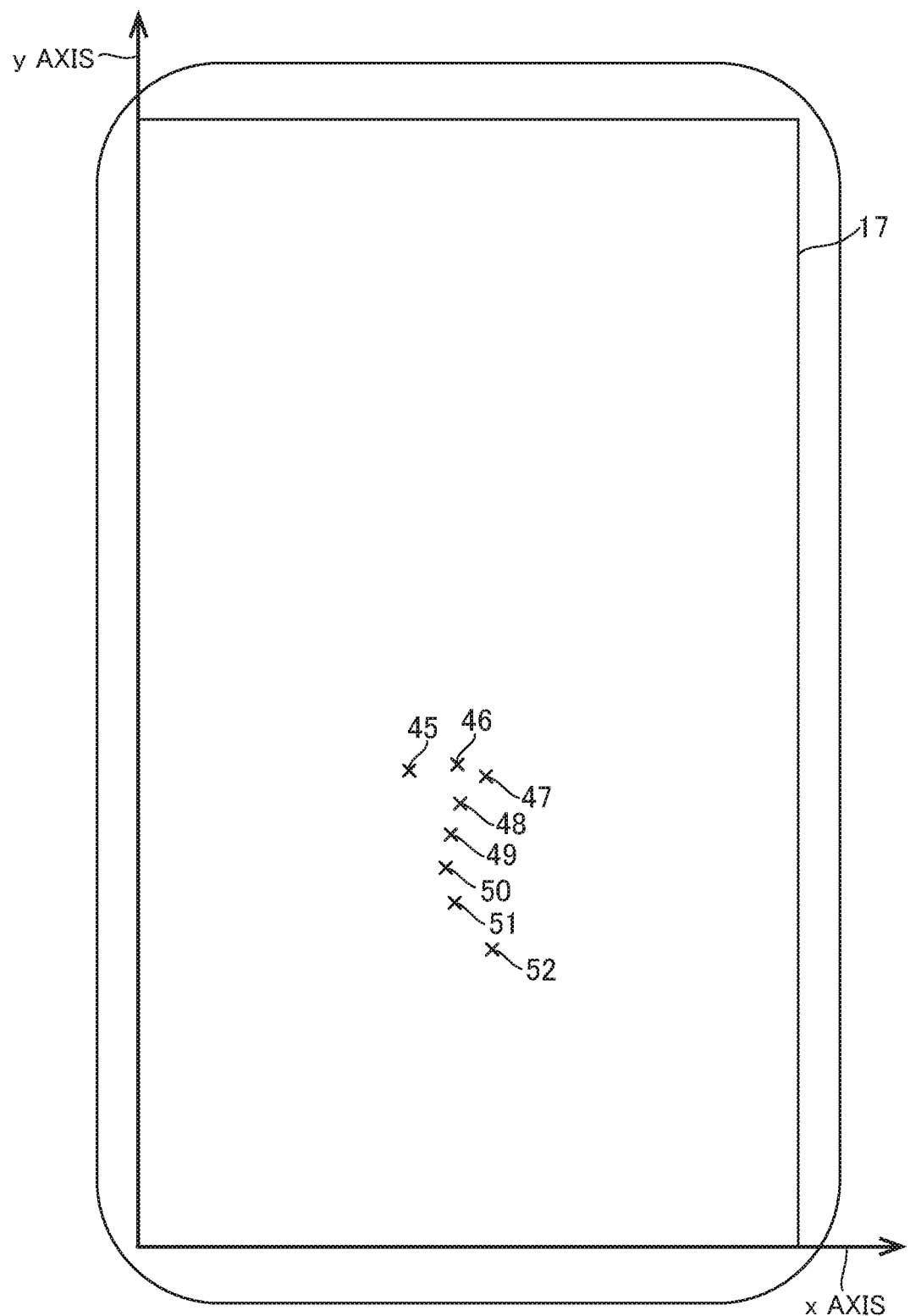
FIG. 14 is an illustration showing an example of data points held in the data point buffer at time t4.

FIG. 14 is an illustration showing an example of the data points held in the data point buffer at time t4. Time t4 is the time after an elapse of time Δt from time t1. A set 40' of the data points held in the data point buffer consists of eight data points P45 to P52. Furthermore, the x coordinate values and the y coordinate values of P45 to P52 are respectively P45($x_{45}$, $y_{45}$), P46($x_{46}$, $y_{46}$) . . . P52 ($x_{52}$, $y_{52}$), and it is assumed that the data points were stored in the order P45, P46, . . . , P52.

Figure 15:
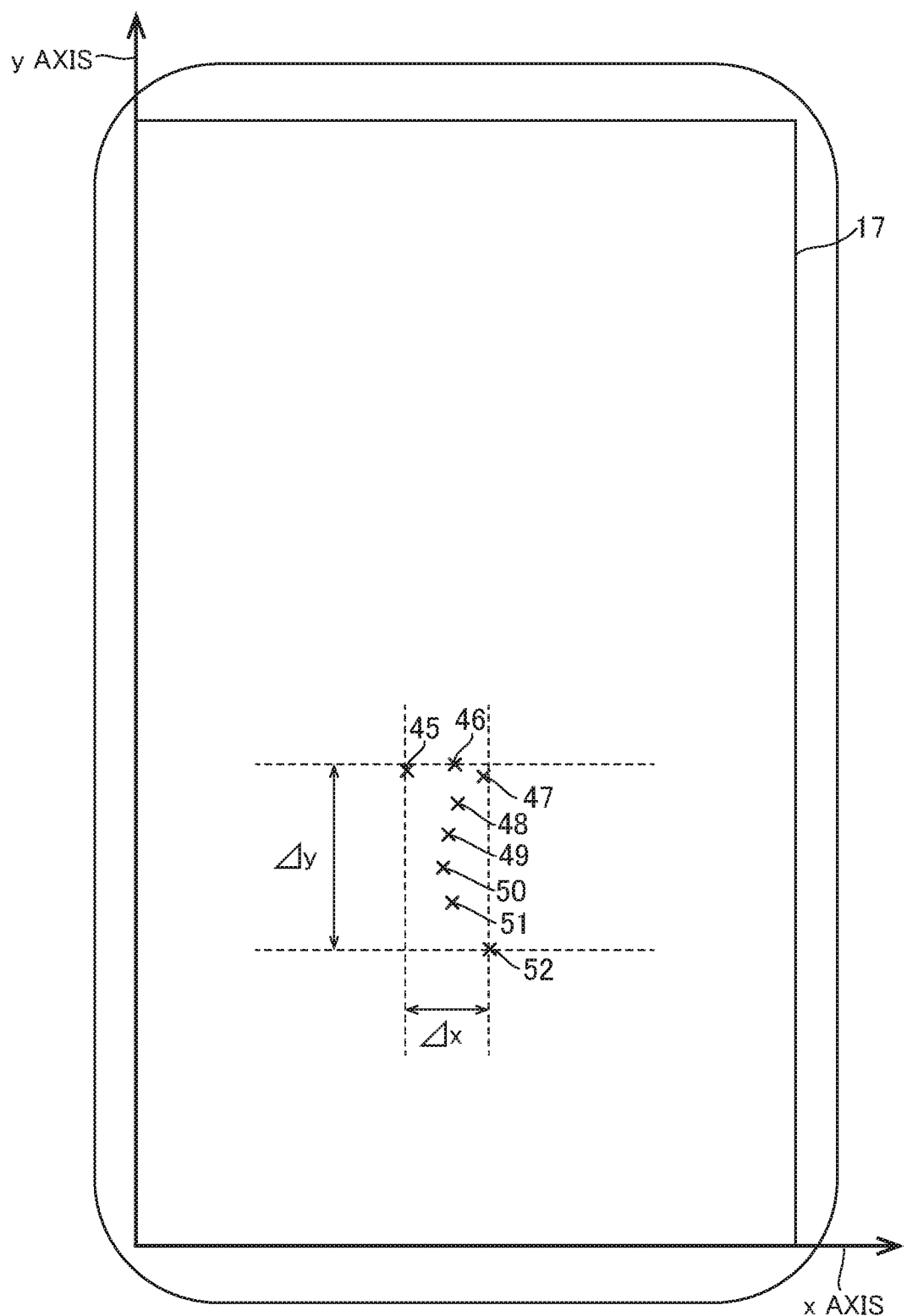
FIG. 15 is an illustration showing an example of data points held in the data point buffer at time t4.

It is understood from FIG. 15 that the difference $x_{52}$–$x_{45}$ (=Δx) between the x coordinate values of P52 and P45 corresponds to abs(max(x)–min(x)) and that the difference $y_{46}$–$y_{52}$ (=Δy) between the y coordinate values of P46 and P52 corresponds to abs(max(y)–min(y)). According to FIG. 14, 2×Δx<Δy. Thus, the function rotate(x, y) satisfies the inequality and thus returns a true value.

Then, the function aop(x, y) calculates the differences ($y_{46}$–$y_{45}$, $y_{47}$–$y_{46}$, . . . $y_{52}$–$y_{51}$) between values temporally succeeding and following each other by using the function down(y). According to FIG. 14, all the differences except $y_{46}$–$y_{45}$ are negative. Thus, the function down(y) satisfies the inequality and thus returns a true value.

Figure 16:
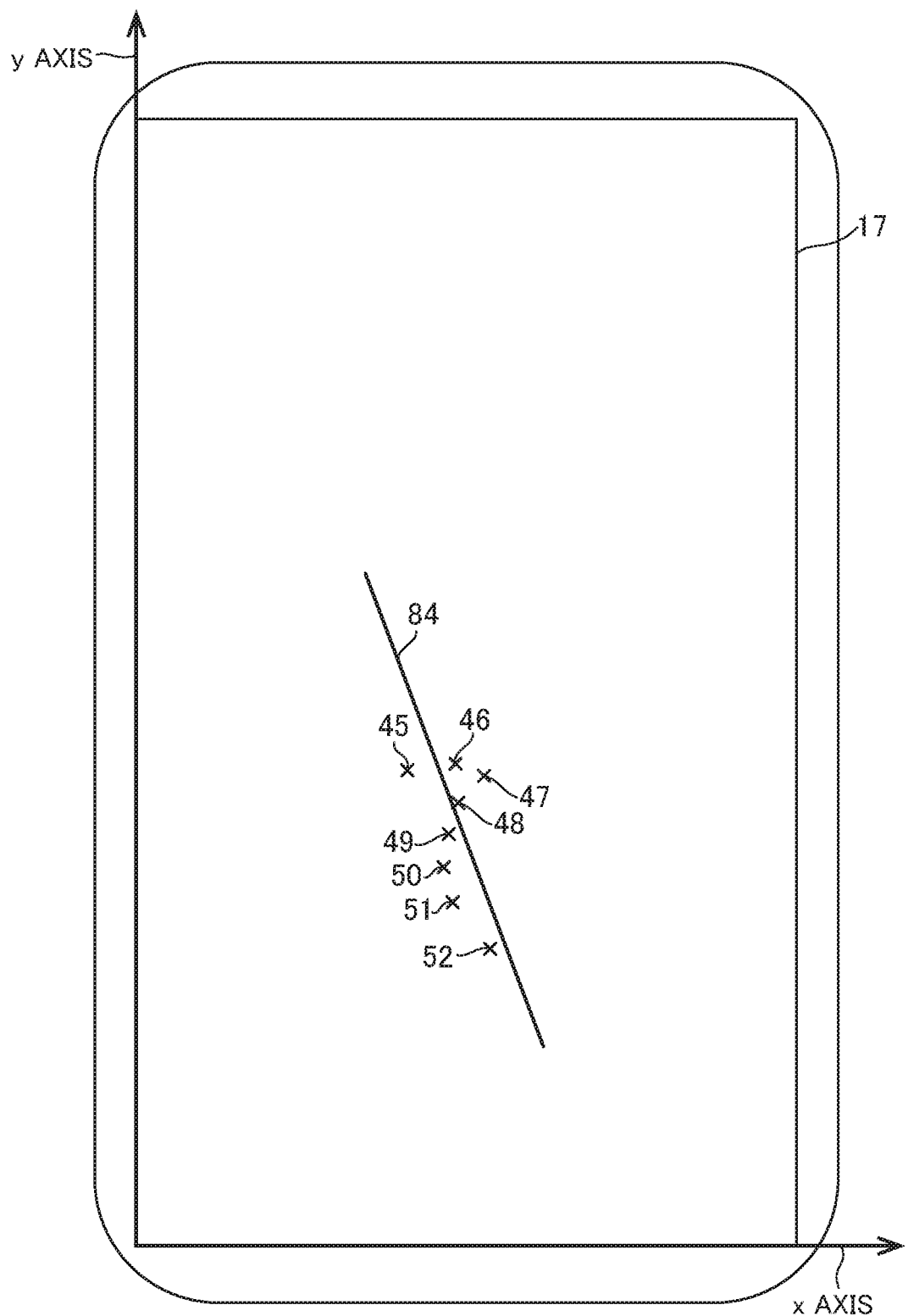
FIG. 16 is an illustration showing a regression line obtained from the set of data points shown in FIG. 14.

In the above example, the function rotate(x, y) is true, and the function down(y) is true. Thus, the function aop(x, y) obtains a regression line 84, shown in FIG. 16, from the set 40' of data points, and calculates an angle 94c obtained by adding 180 degrees to an angle 94b calculated by subtracting an angle 94a calculated from the slope of the regression line 84 from 90 degrees, as shown in FIG. 17.

Figure 18:
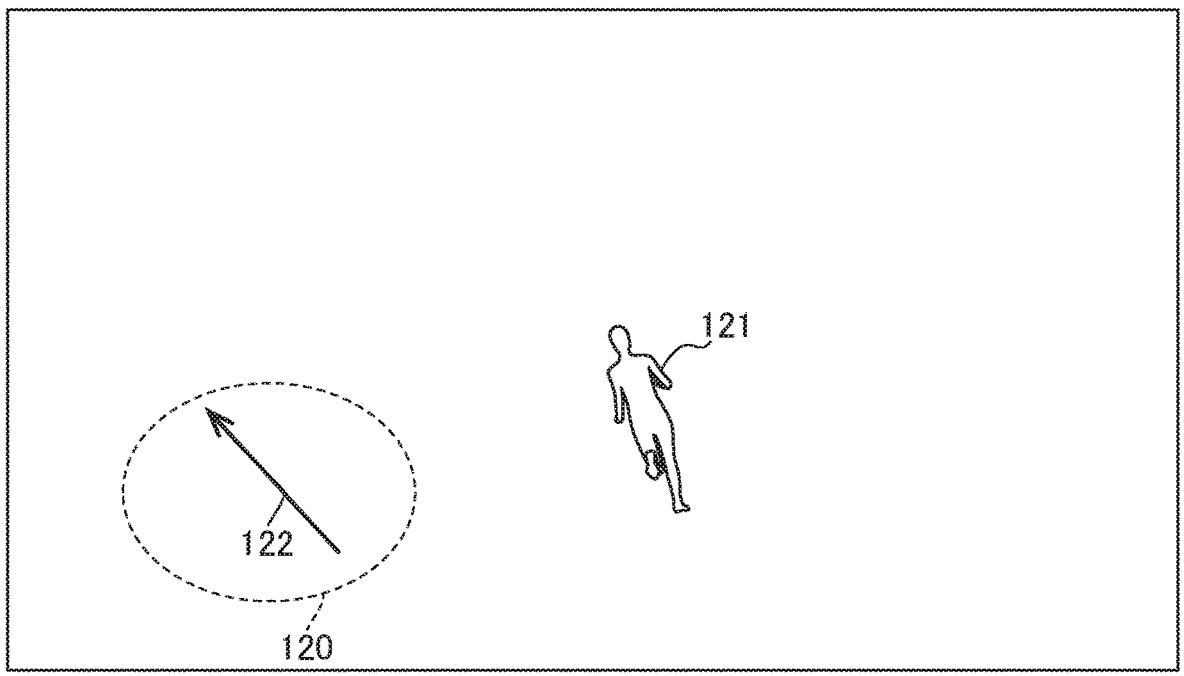
FIG. 18 is an illustration showing how a virtual character is controlled on the basis of a set of data points by the electronic device according to the embodiment of the present invention.

FIG. 18 is an illustration showing how the electronic device 10 according to the embodiment of the present invention controls a virtual character 121 on the basis of a set 120 of data points. FIG. 18 shows the set 120 of data points visualizing data points corresponding to touch events generated by a user operation on the touchscreen 17. The electronic device 10 controls motion, such as walking, running, and switching direction, of the virtual character 121, which is the object being operated, on the basis of the angle 122 indicated by the set 120 of data points.

Figure 19:
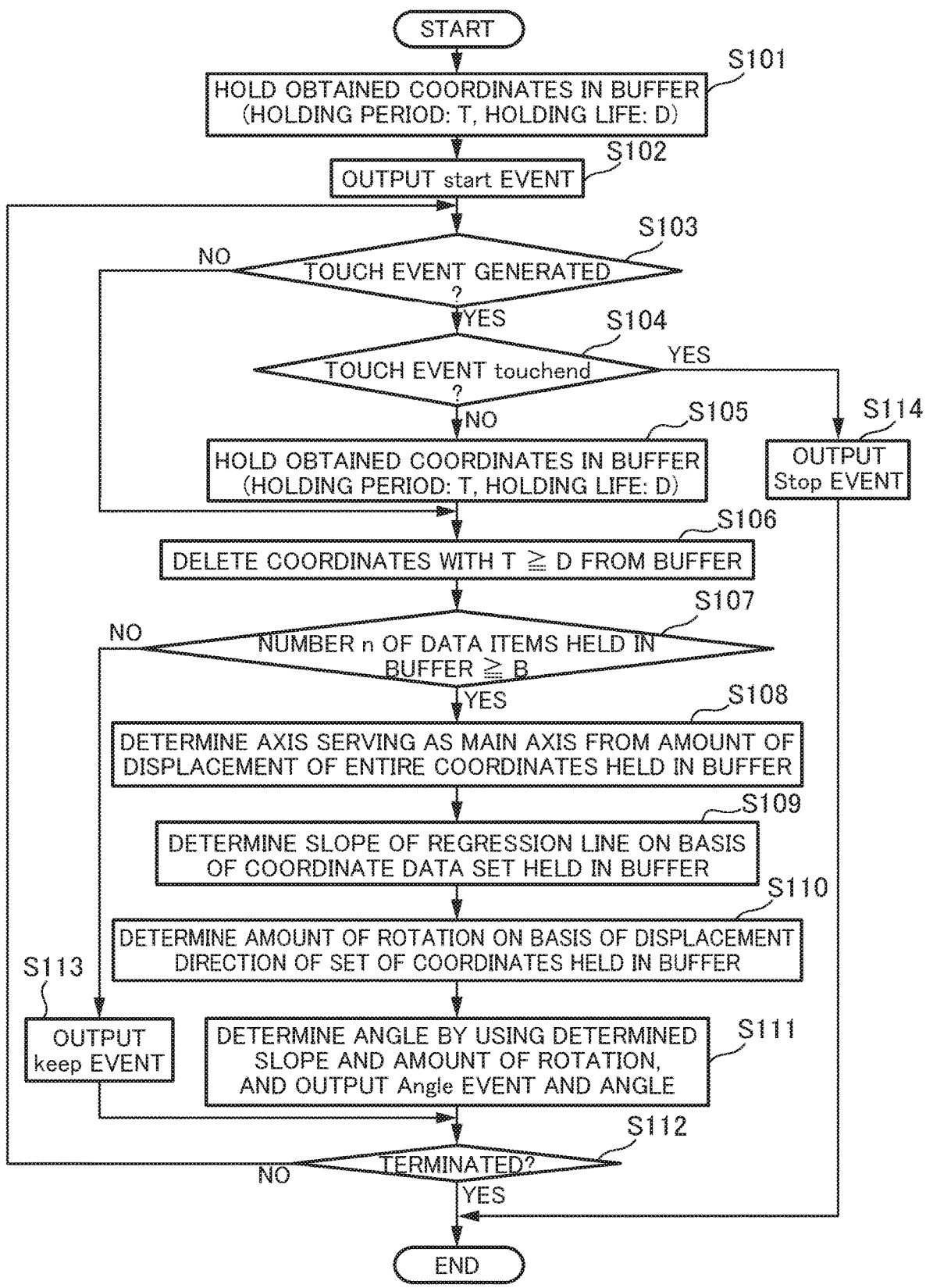
FIG. 19 is a flowchart of information processing by the angle determination unit, according to the embodiment of the present invention.

FIG. 19 is a flowchart of information processing by the angle determination unit 24, according to the embodiment of the present invention. This flowchart starts when a touch event is generated and the angle determination unit 24 obtains a data point from the touch event.

In step 101, the angle determination unit 24 stores the obtained data point in the data point buffer. At this time, the angle determination unit 24 associates, with the data point being stored, T indicating the time, in milliseconds, elapsed after the storage thereof and D indicating the period (holding life), in milliseconds, for which the data point can be stored in the data point buffer.

Then, in step 102, the angle determination unit 24 outputs a start event to the state determination unit 25.

Then, in step 103, the angle determination unit 24 determines whether or not a touch event has been generated. Step 103 is executed after l ms from the start of the flowchart. The flowchart proceeds to step 104 in the case where a touch event has been generated, and the flowchart proceeds to step 106 in the case where no touch event has been generated.

In step 104, the angle determination unit 24 determines whether or not the generated touch event is touchend. The flowchart is terminated in the case where the obtained touch event is touchend. The flowchart proceeds to step 105 in the case where the obtained touch event is not touchend.

In step 105, the angle determination unit 24 obtains a data point from the generated touch event, and stores the data point in the data point buffer. At this time, the angle determination unit 24 associates, with the data point being stored, T indicating, in milliseconds the time elapsed after the storage thereof and D indicating, in milliseconds, the period for which the data point can be stored in the data point buffer.

Then, in step 106, the angle determination unit 24 terminates the holding of data points for which the elapsed period T is greater than or equal to the variable D among the data points held in the data point buffer. The angle determination unit 24 compares the elapsed time T with the variable D for each of the data points stored in the data point buffer, and terminates the holding of each data point for which the elapsed time is greater than or equal to the variable D.

Then, in step 107, the angle determination unit 24 determines whether or not the number n of the data points held in the data point buffer is greater than or equal to the value of the variable B. The flowchart proceeds to step 108 in the case where the number n is greater than or equal to the variable B, and the flowchart proceeds to step 113 in the case where the number n is less than the variable B.

In step 108, the angle determination unit 24 determines one of the x axis and the y axis as the axis of the independent variable on the basis of the amount of displacement of the values on the x axis and the amount of displacement of the values on the y axis in the data points held in the data point buffer. At the same time, the angle determination unit 24 determines the other axis as the axis of the dependent variable.

Then, in step 109, in the case where the x axis is determined as the axis of the independent variable in step 108, the angle determination unit 24 determines the angle of the slope of a regression line by calculating the angle of the slope by using Eq. (5). In one example, when calculating the angle of the slope by using Eq. (5), the angle determination unit 24 calculates the angle within the range of 0 to 90 degrees and 270 to 360 degrees. In the case where the y axis is determined as the axis of the independent variable in step 108, the angle determination unit 24 calculates the angle of the slope by using Eq. (6), and subtracts the calculated angle from 90 degrees, thereby determining the angle of the slope of a regression line. In one example, when calculating the angle of the slope by using E. (6), the angle determination unit 24 calculates the angle within the range of 0 to 90 degrees and 270 to 360 degrees.

Then, in step 110, the angle determination unit 24 determines an amount of rotation indicating whether or not the determined slope of the regression line is to be rotated by 180 degrees on the basis of the displacement direction of the set of data points held in the data point buffer. In one example, in the case where the x axis is determined as the axis of the independent variable in step 108, the angle determination unit 24 calculates the individual differences between values temporally succeeding and following each other on the x axis. The angle determination unit 24 determines the amount of rotation to be 180 degrees when the number of negative calculated differences is greater than the number of positive calculated differences, and determines the amount of rotation to be 0 degrees when the former is less than the latter. In one example, in the case where the y axis is determined as the axis of the independent variable in step 108, the angle determination unit 24 calculates the individual differences between values temporally succeeding and following each other on the y axis. The angle determination unit 24 determines the amount of rotation to be 180 degrees when the number of negative calculated differences is greater than the number of positive calculated differences, and determines the amount of rotation to be 0 degrees when the former is less than the latter.

Then, in step 111, the angle determination unit 24 determines an angle on the basis of the determined slope of the regression line and the determined amount of rotation. Specifically, the angle determination unit 24 determines an angle by adding the determined amount of rotation to the angle corresponding to the determined slope of the regression line. For example, in the case where the amount of rotation is 0 degrees, the angle determined by the angle determination unit 24 is the angle corresponding to the determined slope of the regression line. The angle determination unit 24 outputs an angle event together with the determined angle to the state determination unit 25, and proceeds to step 112.

In the case where the number n is less than the variable B in step 107, in step 113, the angle determination unit 24 outputs a keep event to the state determination unit 25, and proceeds to step 112.

In step 112, the flowchart returns to step 103 unless terminated, for example, due to the termination of the game application. The angle determination unit 24 executes the processing in steps 103 to 112 every I ms.

When the flowchart is terminated, the angle determination unit 24 deletes all the data points held in the data point buffer.

Next, main operations and advantages of the electronic device 10 according to the embodiment of the present invention will be described. This embodiment utilizes the characteristic of a projection-type electrostatic capacitive touchscreen, in which when the touchscreen 17 is swiped with a finger, six or more touch events are generated within an extremely short period, such as 100 ms. The system architecture of the software implemented by the electronic device 10 has a three-layer structure, in which the angle determination unit 24, the state determination unit 25, and the application unit 26 respectively correspond to the first layer, the second layer, and the third layer, where the third layer corresponds to the game application. The first layer calculates the swipe direction for a set of a plurality of generated touch events (a set of data points), in the form of a linear angle over 360 degrees. Since it is possible to use touch events generated within an extremely short period, it is possible for the first layer to continue to calculate an angle at high speed. Furthermore, by obtaining an angle indicated by a set of data points held in the data point buffer just for a predefined extremely short holding period (e.g., 165 ms), it is possible for the first layer to obtain an angle of the direction intended by the user who has performed a touch operation on the touchscreen 17, without having to use reference points.

The electronic device 10 in this embodiment is designed on the basis of the concept that, however complex a user operation such as a swipe is, within an extremely short period, such as 100 ms, the user operation can be modeled on linear motion with constant velocity, and thus it is possible to predict and approximate an arbitrary nonlinear function ($\approx$ human operation) by continuously calculating the values of the angle of motion with constant velocity.

The first layer calculates an angle at a relatively low frequency is the case where the value of the variable I is set to be relatively large. In this case, even immediately after the start of generation of touch events, for example, even immediately after the user has started an operation, the first layer calculates an angle in a state where a relatively large number of data points are held in the data point buffer. As described above, by setting the value of the variable I to be relatively large, it becomes possible to calculate an angle in which a user operation is reflected relatively loosely. Meanwhile, the first layer calculates an angle at a relatively high frequency in the case where the value of the variable I is set to be relatively small. In this case, immediately after the start of generation of touch events, for example, immediately after the user has started an operation, the first layer calculates an angle in a state where a relatively small number of data points are held in the data point buffer. As described above, by setting the value of the variable I to be relatively small, it becomes possible to calculate an angle in which a user operation is reflected relatively immediately.

The first layer calculates the slope of a regression line by using the method of least squares in calculating an angle indicated by a set of data points. In the case where x is fixed as the independent variable and y is fixed as the dependent variable, it is difficult to calculate the slope, for example, in the case where the slope is in a direction along the y axis. Thus, the first layer determines the independent variable and the dependent variable from the amount of displacement of the data points before calculating the slope of a regression line. With this configuration, it becomes possible for the first layer to stably calculate the slope of a regression line.

In calculating the angle indicated by the set of data points, the first layer determines an amount of rotation indicating whether or not the determined slope of the regression line is to be rotated by 180 degrees, on the basis of the displacement direction of the set of data points, corresponding to a rough direction in which the user moves a finger on the touchscreen 17. By determining the amount of rotation, which cannot be ascertained from the slope of the regression line, calculated by using the method of least squares, it is possible to obtain an angle intended by the user who has performed a touch operation on the touchscreen 17.

The first layer calculates an angle corresponding to the swipe direction for a set of data points per predefined processing period, for example, per period corresponding to the frame rate of the game application as the predefined processing period. The second layer determines a vector quantity (angle and magnitude) indicating the state of the slope of the virtual controller per predefined processing period by using continuously output angle information, and outputs the vector quantity to the game application. With this configuration, in this embodiment, it becomes possible to give an input to the game application on the basis of the angle calculated per predefined processing period. Furthermore, with this configuration, without requiring any layer to use past touched coordinates as reference points, it becomes possible to give an input on the basis of an accurate movement angle at high frequency at the frame rate calculated by the first layer. As described above, in this embodiment, the electronic device 10 calculates an angle without using the spatial concept of points, such as starts points (start coordinates) and end points (end coordinates), which has been used in the virtual controllers in the existing technology.

Furthermore, in this embodiment, as opposed to the virtual controller in the existing technology, i.e., the virtual controller that uses a vector obtained on the basis of the positional relationship between reference coordinates and current instruction coordinates, the concept of reference coordinates is not involved, which makes it possible to provide higher responsiveness compared with the virtual controller with which reference coordinates are defined. In particular, in the case of an operation for switching the direction of a virtual character or the like, even if the user performs an operation on the touchscreen in a direction considerably different from the direction before switching, since the concept that the current instruction coordinates approach the reference coordinates is not lacking, it is possible to switch the direction by quickly responding to the intent of the operation by the user, which is considerably advantageous. Furthermore, with the configuration described above, a user operating a smartphone is allowed to perform operations with one hand. This makes it possible to solve the problem that it is necessary for a user to be constantly aware of reference coordinates when performing operations with the virtual joystick in the existing technology and thus there are cases where it is difficult to perform operations with one hand. As described above, in this embodiment, a virtual controller that enables quicker and more intuitive operation is realized.

Furthermore, in this embodiment, as opposed to the virtual controller in the existing technology, since input is not based on the movement distance of a finger from reference coordinates, it becomes possible for the electronic device 10 to realize operations intended by the user via operations with smaller amounts of movement of a finger. Thus, as compared with the existing technology, implementation with a smaller implementation area becomes possible. For example, it becomes possible to realize the same operability irrespective of the size of the touchscreen 17.

Furthermore, since the technology of the virtual controller provided by the electronic device 10 in this embodiment is based on a mathematical model of angle recognition from a swipe operation, the technology is applicable to a wide variety of genres, such as movement in directions over 360 degrees, acceleration and deceleration, and input of commands in a combat game or the like.

The operations and advantages described above also apply similarly to other embodiments and other examples unless otherwise specifically mentioned.

Another embodiment of the present invention may be a program for realizing the functions or the information processing shown in the flowchart in the above-described embodiment of the present invention, or a computer-readable storage medium storing the program. Furthermore, another embodiment of the present invention may be a method for realizing the functions or the information processing shown in the flowchart in the above-described embodiment of the present invention. Furthermore, another embodiment of the present invention may be a server that is capable of providing a computer with a program for realizing the functions or the information processing shown in the flowchart in the above-described embodiment of the present invention. Furthermore, another embodiment of the present invention may be a virtual machine for realizing the functions or the information processing shown in the flowchart in the above-described embodiment of the present invention.

Now, modifications of the embodiments of the present invention will be described. The modifications described below can be combined as appropriate and applied to any embodiment of the present invention as long as no inconsistency arises.

In one modification, the electronic device 10 has installed there in a game application that disposes a virtual object in a virtual space and that presents a user with a game image photographed by a virtual camera disposed in the virtual space while causing the game to proceed. When the game application is executed, the electronic device 10 displays, on the touchscreen 17, a game image obtained by photographing the virtual object, etc. disposed in the virtual space by means of the virtual camera disposed in the virtual space, and controls the virtual camera in accordance with user operations. As described above, when the game application is executed, the electronic device 10 provides a virtual controller for controlling the virtual camera, which is an object being operated, in accordance with user operations. The control of the virtual camera refers to controlling the motion or the visual field region of the virtual camera disposed in the virtual space.

Figure 20:
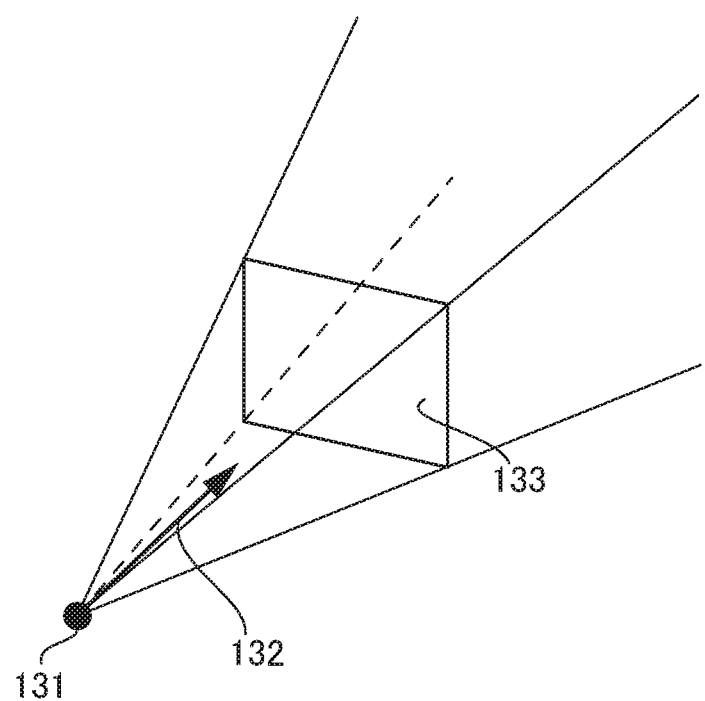
FIG. 20 is an illustration showing a virtual camera, disposed in a virtual space, that captures an image displayed by the electronic device according to the embodiment of the present invention.

FIG. 20 is an illustration showing a virtual camera 131 disposed in the virtual space, which captures an image displayed by the electronic device 10 according to the embodiment of the present invention. FIG. 20 shows the position of the virtual camera 131 and a viewing direction 132 of the virtual camera 132. The viewing direction 132 is defined in the form of a three-dimensional vector with the viewpoint set at the position of the virtual camera 131. A visual field region is defined with a certain viewing angle from the virtual camera 131 into the viewing direction 132, and a two-dimensional screen 133, constituting a plane perpendicular to the viewing direction 132, is defined in the visual field region. The virtual object in the virtual space is projected onto the two-dimensional screen 133, whereby a two-dimensional image is formed.

In one modification, the input device 12 and the display device 13 have separate forms disposed at different positions. In this case, the input device 12 is a touchscreen or a device having a function equivalent to the function of a projection-type electrostatic capacitive touchscreen. It suffices for the display device 13 to be a device that displays an application screen, etc. to the user of the electronic device 10 under the control of the processor 11. For example, the display device 13 is a liquid crystal display, a display using organic EL, or a plasma display.

In one modification, the angle determination unit 24 calculates the slope of a regression line by using a known method other than the method of least squares. In this case, the angle determination unit 24 does not determine an amount of rotation indicating whether or not the determined slope of the regression line is to be rotated by 180 degrees, and thus does not determine the axis of the independent variable and the axis of the dependent variable. For example, it is possible to use an algorithm such as the Kalman filter or particle filters.

In one modification, the angle determination unit 24 does not define the variable D, and does not terminate the holding of a data point for which it is determined that the predefined holding period has expired among the data points held in the data point buffer. In this case, the angle determination unit 24 determines an angle while referring to data points stored in a specific time band that is shifted per time defined by the variable I.

In one modification, the angle determination unit 24 does not define the variable V. In this case, the angle determination unit 24 calculates and determines an angle by using the function aop(x, y) irrespective of the value of the variance of the independent variable.

In one modification, the electronic device 10 is equipped with an acceleration sensor that is capable of determining the gravitational direction. The angle determination unit 24 determines a weight coefficient by using information obtained from the acceleration sensor. For example, in the case where the smartphone is held in portrait orientation and thus the y axis of the touchscreen 17 is the gravitational direction, the angle determination unit 24 determines w to be 2. Meanwhile, in the case where the smartphone is held in landscape orientation and thus the x axis of the touchscreen 17 is the gravitational direction, and the game engine provided in the game application does not perform transformation between vertical and horizontal coordinates, the angle determination unit 24 determines w to be a value less than 1, such as 0.5.

In one modification, when obtaining a touch event, the angle determination unit 24 obtains a set (x, y) of numerical values consisting of two variables, and stores the set (x, y) of numerical values consisting of the two variables in the data point buffer without associating a data point obtaining time t therewith. For example, the angle determination unit 24 can store information corresponding to a data point obtaining time t in a memory area or the like in the storage device 14 other than the data point buffer and can manage the information in association with data stored in the data point buffer.

The processing or operation described above may be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

10 Electronic device
11 Processor
12 Input device
13 Display device
14 Storage device
15 Communication device
16 Bus
17 Touchscreen
21 Input unit
22 Display unit
23 Control unit
24 Angle determination unit
25 State determination unit
26 Application unit
31, 33, 35 Angle
32, 34, 36 Direction
81, 82, 83, 84 Regression line
91, 92a, 92b, 93a, 93b, 94a, 94b, 94c Angle
120 Set
121 Virtual character
122 Angle
131 Virtual camera
132 Viewing direction
133 Two-dimensional screen

The invention claimed is:

1. A non-transitory computer readable medium storing a program that is executed on an electronic device equipped with a touchscreen, the program causing the electronic device to execute:
holding data points indicated by values on a first axis and values on a second axis that are obtained based on touch events generated as a result of an operation on the touchscreen by a user to produce a plurality of held data points;
terminating holding of a data point for which a predefined holding period has expired among the plurality of held data points;
determining a slope of a regression line based on the plurality of held data points;
determining an amount of rotation by which the slope of the regression line is to be rotated, based on a displacement direction of a set of the plurality of held data points; and
determining an angle by which the user controls an object being operated in a virtual space, based on the slope of the regression line and the amount of rotation.

2. The non-transitory computer readable medium according to claim 1, wherein determining the amount of rotation comprises determining an angle for controlling the object being operated, and wherein the amount of rotation indicates whether or not the slope of the regression line is to be rotated by 180 degrees is determined based on a displacement direction of a plurality of data points temporally succeeding and following each other among the plurality of held data points.

3. The non-transitory computer readable medium according to claim 1, wherein the program causes the electronic device to further execute:
determining one of the first axis and the second axis as an axis of an independent variable, and
determining the other axis as an axis of a dependent variable based on an amount of displacement of the values on the first axis and an amount of displacement of the values on the second axis in the plurality of held data points, and
wherein the slope of the regression line is determined further based on the axis of the independent variable and the axis of the dependent variable.

4. The non-transitory computer readable medium according to claim 3,
wherein the axis of the independent variable is determined based on a difference between a maximum value and a minimum value of the values on the first axis and a difference between a maximum value and a minimum value of the values on the second axis.

5. The non-transitory computer readable medium according to claim 3,
wherein the axis of the independent variable is determined by comparing a magnitude of a result of applying a weight to a difference between a maximum value and a minimum value of the values on the first axis and a magnitude of a difference between a maximum value and a minimum value of the values on the second axis.

6. The non-transitory computer readable medium according to claim 1,
wherein, in response to determining an angle by which the object being controlled is controlled, an amount of rotation indicating whether or not the slope of the regression line is to be rotated by 180 degrees is determined by comparing a number of positive values and a number of negative values among differences between values temporally succeeding and following each other on the axis of an independent variable in the plurality of held data points.

7. The non-transitory computer readable medium according to claim 1, wherein determining the slope of the regression line comprises:
determining an average of an independent variable and an average of an dependent variable in the plurality of held data points;
determining, by using the average of the independent variable and the average of the dependent variable, a deviation of the independent variable and a deviation of the dependent variable in the plurality of held data points;

determining, by using the deviation of the independent variable, a variance of the independent variable in the plurality of held data points;

determining, by using the variance of the independent variable and a variance of the dependent variable, a covariance in the plurality of held data points; and determining the slope of the regression line by dividing the covariance by the variance of the independent variable.

8. The non-transitory computer readable medium according to claim 7, wherein the first axis is an X axis indicating a widthwise direction of directions in which sensors of the touchscreen are arrayed, wherein the second axis is a Y axis indicating a lengthwise direction of the directions in which the sensors of the touchscreen are arrayed, which is perpendicular to the first axis, and wherein, in response to the axis of the independent variable being the second axis, the slope of the regression line is determined by subtracting, from 90 degrees, an angle corresponding to the slope of the regression line and by dividing the covariance by the variance of the independent variable.

9. The non-transitory computer readable medium according to claim 1, wherein the first axis is an X axis indicating a widthwise direction of directions in which sensors of the touchscreen are arrayed, and the second axis is a Y axis indicating a lengthwise direction of the directions in which the sensors of the touchscreen are arrayed, which is perpendicular to the first axis.

10. The non-transitory computer readable medium according to claim 1, wherein the angle is determined per predefined processing period.

11. The non-transitory computer readable medium storing a program suite for a game that is executed on the electronic device equipped with the touchscreen, the program suite including a program according to claim 10, wherein the predefined processing period is a period corresponding to a frame rate for executing the game, wherein the program suite causing the execution of:

determining an angle and a magnitude per the predefined processing period based on the angle that is determined per the predefined processing period; and controlling the object being controlled, which is displayed on the touchscreen, based on the angle and the magnitude that are determined per the predefined processing period.

12. The non-transitory computer readable medium storing a program suite for a game that is executed on the electronic device equipped with the touchscreen, the program suite including a program according to claim 10, wherein the predefined processing period is a period corresponding to a frame rate for executing the game, wherein the program suite causing the execution of:

determining an angle and a magnitude per the predefined processing period based on the angle that is determined per the predefined processing period; and controlling a virtual camera for photographing a game image, the virtual camera serving as the object being controlled, which is displayed on the touchscreen, based on the angle and the magnitude that are determined per the predefined processing period.

13. An electronic device comprises:

a touchscreen, wherein the electronic device further comprises:

data points indicated by values on a first axis and values on a second axis that are obtained based on touch events generated as a result of an operation on the touchscreen by a user to produce a plurality of held data points, wherein the holding of a data point for which a predefined holding period has expired among the plurality of held data points is terminated;

a slope of a regression line that is determined based on the plurality of held data points;

an amount of rotation by which the slope of the regression line is to be rotated is determined based on a displacement direction of a set of the plurality of held data points; and an angle by which the user controls an object being operated in a virtual space is determined based on the slope of the regression line and the amount of rotation.

14. A method that is executed on an electronic device equipped with a touchscreen, the method comprising:

holding data points indicated by values on a first axis and values on a second axis that are obtained based on touch events generated as a result of an operation on the touchscreen by a user to produce a plurality of held data points;

terminating holding of a data point for which a predefined holding period has expired among the plurality of held data points;

determining a slope of a regression line based on the plurality of held data points;

determining an amount of rotation by which the slope of the regression line is to be rotated, based on a displacement direction of a set of the plurality of held data points; and determining an angle by which the user controls an object being operated in a virtual space, based on the slope of the regression line and the amount of rotation.

* * * * *